United States Patent
Wachter et al.

(10) Patent No.: US 12,298,444 B2
(45) Date of Patent: *May 13, 2025

(54) RANGE CALIBRATION OF LIGHT DETECTORS

(71) Applicant: Waymo LLC, Mountain View, CA (US)

(72) Inventors: Luke Wachter, San Francisco, CA (US); Pierre-Yves Droz, Los Altos, CA (US)

(73) Assignee: Waymo LLC, Mountain View, CA (US)

( * ) Notice: Subject to any disclaimer, the term of this patent is extended or adjusted under 35 U.S.C. 154(b) by 91 days.

This patent is subject to a terminal disclaimer.

(21) Appl. No.: 18/313,802

(22) Filed: May 8, 2023

(65) Prior Publication Data
US 2023/0280452 A1   Sep. 7, 2023

Related U.S. Application Data

(63) Continuation of application No. 16/445,394, filed on Jun. 19, 2019, now Pat. No. 11,681,030.
(Continued)

(51) Int. Cl.
*G01S 7/497* (2006.01)
*G01S 7/4863* (2020.01)
(Continued)

(52) U.S. Cl.
CPC ............ *G01S 7/497* (2013.01); *G01S 7/4863* (2013.01); *G01S 7/4865* (2013.01); *G01S 17/931* (2020.01); *G06V 20/13* (2022.01)

(58) Field of Classification Search
None
See application file for complete search history.

(56) References Cited

U.S. PATENT DOCUMENTS

| | | | |
|---|---|---|---|
| 3,158,861 A | 11/1964 | Iribe | |
| 3,897,997 A | 8/1975 | Kalt | |

(Continued)

FOREIGN PATENT DOCUMENTS

| | | | |
|---|---|---|---|
| CN | 101027574 A | 8/2007 | |
| CN | 103064076 B | 6/2014 | |

(Continued)

OTHER PUBLICATIONS

"Who We Are: Our Brands"; no author given; no date; published by the Wi-Fi Alliance, Austin, TX, USA; posted on the Internet at wi-fi,org; retrieved on Sep. 27, 2024. (Year: 2024).*

(Continued)

*Primary Examiner* — Bernarr E Gregory
(74) *Attorney, Agent, or Firm* — McDonnell Boehnen Hulbert and Berghoff LLP

(57) ABSTRACT

Example embodiments relate to range calibration of light detectors. An example method includes emitting a first light signal toward a first region of a calibration target having a first reflectivity and detecting a reflection of the first light signal. The detected reflection of the first light signal has a first intensity. The example method further includes emitting a second light signal toward a second region of the calibration target having a second reflectivity and detecting a reflection of the second light signal from the second region of the calibration target. The detected reflection of the second light signal has a second intensity. Still further, the example method includes determining a first apparent range based on the detected reflection of the first light signal, determining a second apparent range based on the detected reflection of the second light signal, and generating walk-error calibration data for the detector.

20 Claims, 26 Drawing Sheets

Related U.S. Application Data

(60) Provisional application No. 62/814,042, filed on Mar. 5, 2019.

(51) Int. Cl.
    *G01S 7/4865*     (2020.01)
    *G01S 17/931*     (2020.01)
    *G06V 20/13*     (2022.01)

(56) References Cited

U.S. PATENT DOCUMENTS

| | | |
|---|---|---|
| 4,314,249 A | 2/1982 | Onoe |
| 4,621,265 A | 11/1986 | Buse et al. |
| 5,282,014 A | 1/1994 | Ruhl, Jr. et al. |
| 5,294,935 A | 3/1994 | Bauerle |
| 5,606,409 A | 2/1997 | Schneiter |
| 6,061,015 A | 5/2000 | Sugimoto |
| 6,114,985 A | 9/2000 | Russell et al. |
| 6,310,682 B1 | 10/2001 | Gavish et al. |
| 6,552,829 B1 | 4/2003 | Maciey et al. |
| 6,596,996 B1 | 7/2003 | Stone et al. |
| 6,915,228 B2 | 7/2005 | Uffenkamp et al. |
| 7,619,746 B2 | 11/2009 | De Lega |
| 8,958,057 B2 | 2/2015 | Kane et al. |
| 9,046,600 B2 | 6/2015 | James |
| 9,343,815 B2 | 5/2016 | Watts |
| 9,874,441 B1 | 1/2018 | Hines et al. |
| 10,084,967 B1 | 9/2018 | Somasundaram et al. |
| 10,176,596 B1 | 1/2019 | Mou |
| 10,852,731 B1 | 12/2020 | Braley et al. |
| 10,928,490 B2 | 2/2021 | Tatipamula et al. |
| 11,392,124 B1 | 7/2022 | Braley et al. |
| 11,681,030 B2 * | 6/2023 | Wachter ............... G01S 17/931 356/5.08 |
| 2001/0012985 A1 | 8/2001 | Okamoto et al. |
| 2008/0031514 A1 | 2/2008 | Kakinami |
| 2009/0228204 A1 | 9/2009 | Zavoli et al. |
| 2010/0076709 A1 | 3/2010 | Hukkeri et al. |
| 2010/0157280 A1 | 6/2010 | Kusevic et al. |
| 2010/0235129 A1 | 9/2010 | Sharma et al. |
| 2010/0299063 A1 | 11/2010 | Nakamura et al. |
| 2012/0038903 A1 | 2/2012 | Weimer et al. |
| 2012/0069321 A1 | 3/2012 | Quilligan et al. |
| 2013/0325252 A1 | 12/2013 | Schommer et al. |
| 2014/0014829 A1 | 1/2014 | Barber et al. |
| 2014/0152971 A1 | 6/2014 | James |
| 2014/0285676 A1 | 9/2014 | Barreto et al. |
| 2015/0039157 A1 | 2/2015 | Wolfe et al. |
| 2015/0055117 A1 | 2/2015 | Pennecot et al. |
| 2015/0149088 A1 | 5/2015 | Attard et al. |
| 2016/0116592 A1 | 4/2016 | Hiromi et al. |
| 2016/0161610 A1 | 6/2016 | Hiromi |
| 2017/0124781 A1 | 5/2017 | Douillard et al. |
| 2017/0280135 A1 | 9/2017 | Shroff et al. |
| 2017/0307876 A1 | 10/2017 | Dussan et al. |
| 2018/0188361 A1 | 7/2018 | Berger et al. |
| 2018/0189601 A1 | 7/2018 | Dabeer et al. |
| 2018/0284222 A1 | 10/2018 | Garrec et al. |
| 2018/0284275 A1 | 10/2018 | LaChapelle |
| 2018/0307245 A1 | 10/2018 | Khawaja et al. |
| 2018/0313940 A1 | 11/2018 | Wu et al. |
| 2019/0049242 A1 | 2/2019 | Adams et al. |
| 2019/0049311 A1 | 2/2019 | Barber |
| 2019/0049566 A1 | 2/2019 | Adams et al. |
| 2019/0104295 A1 | 4/2019 | Wendel et al. |
| 2019/0120947 A1 | 4/2019 | Wheeler et al. |
| 2019/0187249 A1 | 6/2019 | Harmer et al. |
| 2019/0204425 A1 | 7/2019 | Abari et al. |
| 2019/0249985 A1 | 8/2019 | Stieff et al. |
| 2019/0258251 A1 | 8/2019 | Ditty et al. |
| 2019/0258899 A1 | 8/2019 | Coogan et al. |
| 2019/0331482 A1 | 10/2019 | Lawrence et al. |
| 2019/0392610 A1 | 12/2019 | Cantadori et al. |
| 2020/0191943 A1 | 6/2020 | Wu et al. |
| 2020/0249354 A1 | 8/2020 | Yeruhami et al. |

FOREIGN PATENT DOCUMENTS

| | | |
|---|---|---|
| CN | 204331026 U | 5/2015 |
| CN | 107688185 A | 2/2018 |
| CN | 108415003 A | 8/2018 |
| CN | 109212544 A | 1/2019 |
| JP | H07128438 A | 5/1995 |
| JP | H10020035 A | 1/1998 |
| JP | 2000509150 A | 7/2000 |
| JP | 2006258690 A | 9/2006 |
| JP | 2007147333 A | 6/2007 |
| JP | 2007225342 A | 9/2007 |
| JP | 2009544023 A | 12/2009 |
| JP | 2011514709 A | 5/2011 |
| JP | 2017032355 A | 2/2017 |
| JP | 2018505427 A | 2/2018 |

OTHER PUBLICATIONS

"WiMAX Forum: Trademark Policy and Trademark Usage Guidelines"; no author given; dated Sep. 6, 2007; published by the WiMAX Forum, Clackamas, OR, USA; posted on the Internet at wimaxforum.org. (Year: 2007).*

"Guidance for use of the LTE logo"; no author given; no date given; published by the European Telecommunications Standards Institute (ETSI); posted on the Internet at www.3gpp.org; retrieved on Sep. 27, 2024. (Year: 2024).*

H.-S. Cho, C.-H. Kim and S.-G. Lee, "A High-Sensitivity and Low-Walk Error LADAR Receiver for Military Application," in IEEE Transactions on Circuits and Systems I: Regular Papers, vol. 61, No. 10, pp. 3007-3015, Oct. 2014, doi: 10.1109/TCSI.2014.2327282. (Year: 2014).*

S. Kurtti, J. Nissinen, and J. Kostamovaara, A Wide Dynamic Range CMOS Laser Radar Receiver With a Time-Domain Walk Error Compensation Scheme, IEEE Transactions on Circuits and Systems-I: Regular Papers, vol. 64, No. 3, Mar. 2017.

Hong-Soo Cho, Chung-Hwan Kim, and Sang-Gug Lee, A High-Sensitivity and Low-Walk Error LADAR Receiver for Military Application, IEEE Tranactions on Circuits and Systems—I: Regular Papers, vol. 61, No. 10, Oct. 2014.

Bharat Lohani, PhD, Airborne Altimetric LiDAR: Principle, Data Collection, Processing and Applications, Published 2014, Department of Civil Engineering, IIT Kanpur, India.

Weiji He, Boyu Sima, Yunfei Chen, Huidong Dai, Qian Chen, Guohua Gu, Abstract of "A Correction Method for Range Walk Error in Photon Counting 3D Imaging LIDAR," Sciencedirecty.com, Optics Communications, vol. 308, Nov. 1, 2013, pp. 211-217.

"Automatic Camera and Range Sensor Calibration using a single Shot"; Andreas Geiger, et al.; 2012 IEEE International Conference on Robotics and Automation (May 2012).

"A Novel Multi-Planar LIDAR and Computer Vision Calibration Procedure Using 2D Patterns for Automated Navigation"; Lili Huang, et al.; 2009 IEEE Intelligent Vehicles Symposium (Jun. 3-5, 2009).

"Radiometric Calibration of Terrestrial Laser Scanners with External Reference Targets"; Sanna Kaasalainen, et al.; Remote Sensing 2009, 1, 144-158 (Jul. 3, 2009).

"3D LIDAR-Camera Extrinsic Calibration Using an Arbitrary Trihedron"; Xiaojin Gong, et al.; Sensors 2013, 13, 1902-1918 (Feb. 1, 2013).

"Sensorfusion Using Spatio-Temporal Aligned Video and Lidar for Improved Vehicle Detection"; Mirko Mahlisch et al.; Intelligent Vehicles Symposium 2006 (Jun. 13-15, 2006).

Huikari, Jaakko, Sahba Jahromi, Jussi-Pekka Jansson, and Juha Kostamovaara. "A laser radar based on a "impulse-like" laser diode transmitter and a 2D Spad/Tdc receiver." In 2017 IEEE International Instrumentation and Measurement Technology Conference (I2MTC), pp. 1-6. IEEE, 2017.

International Search Report and Written Opinion for International Application No. PCT/US2020/019283.

\* cited by examiner

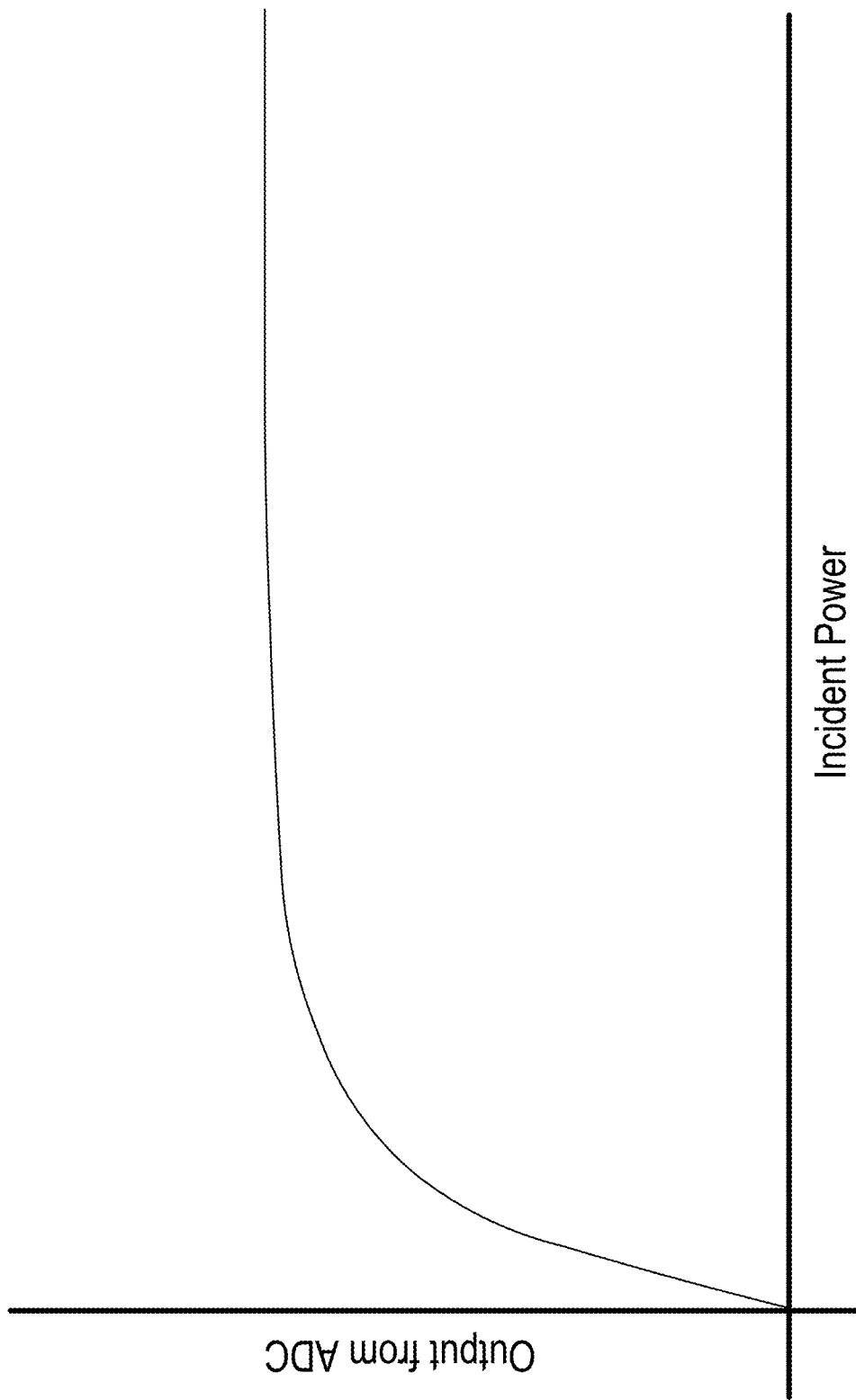

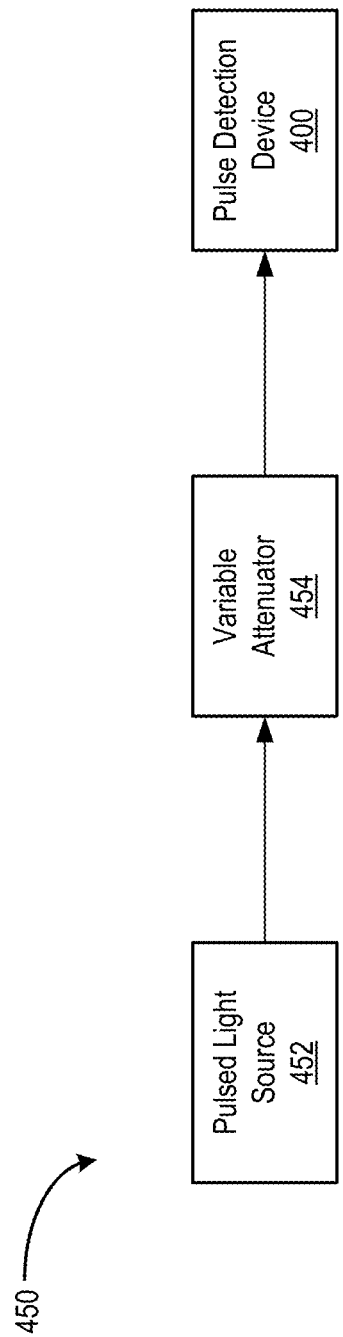

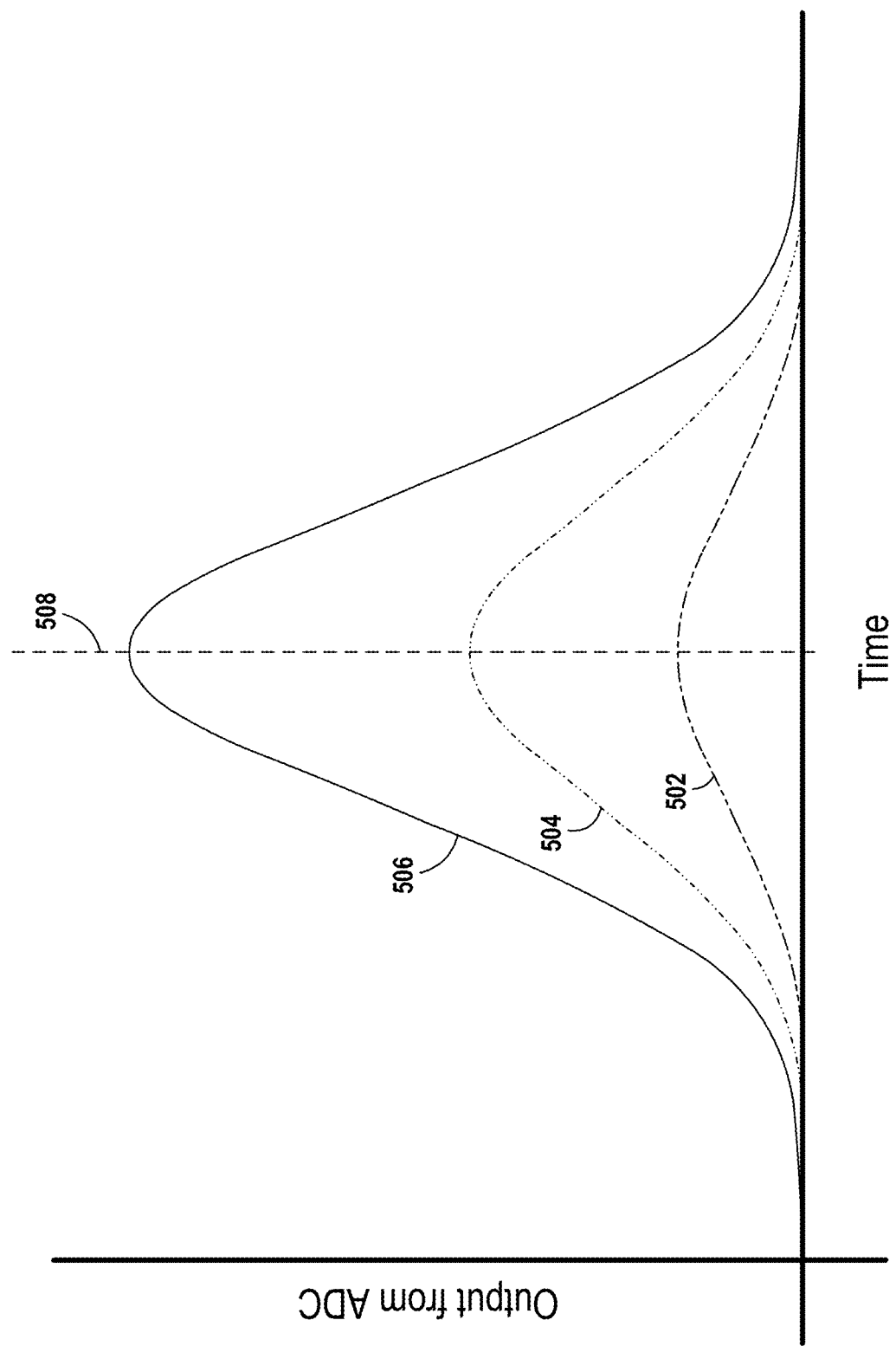

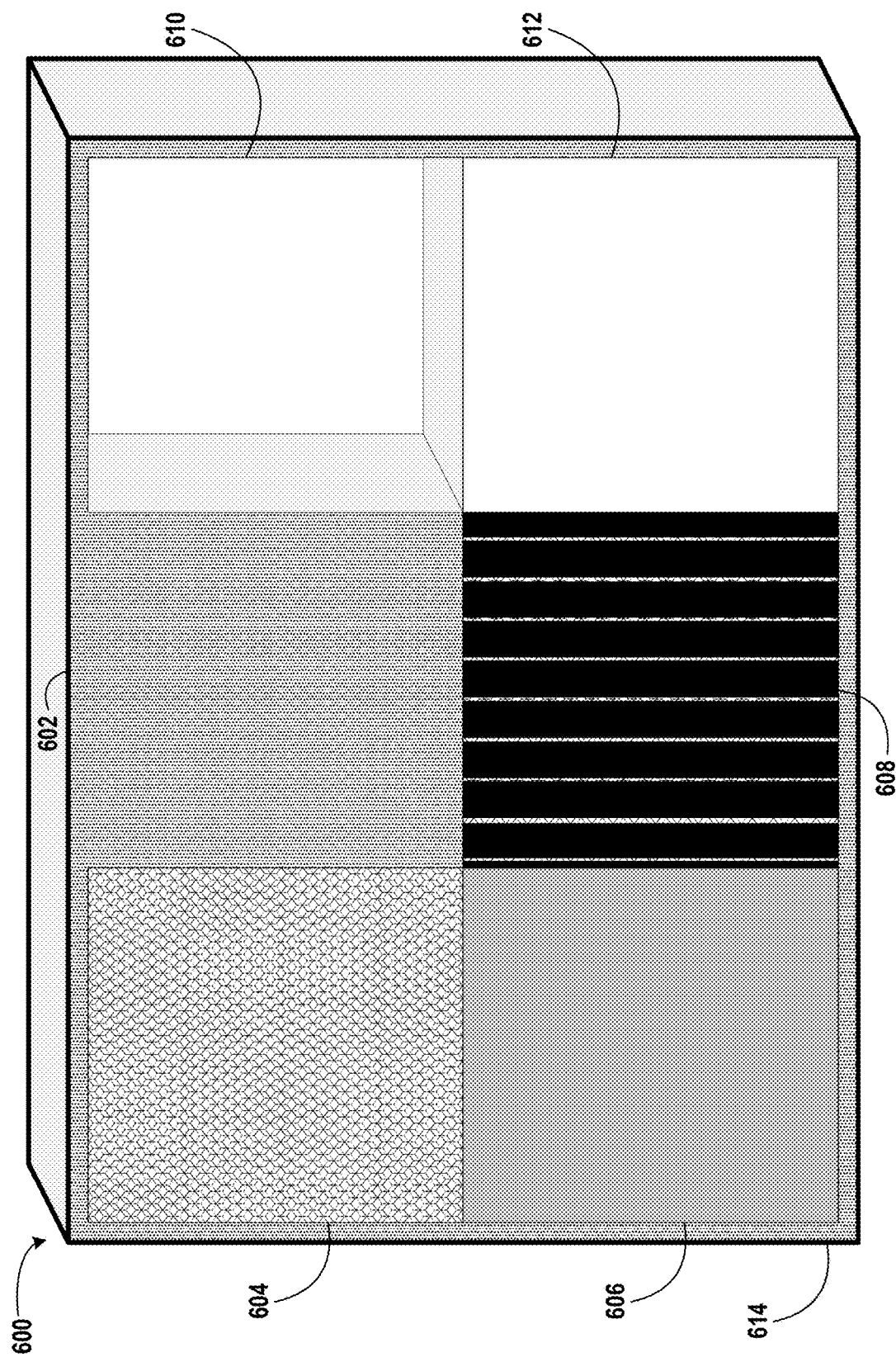

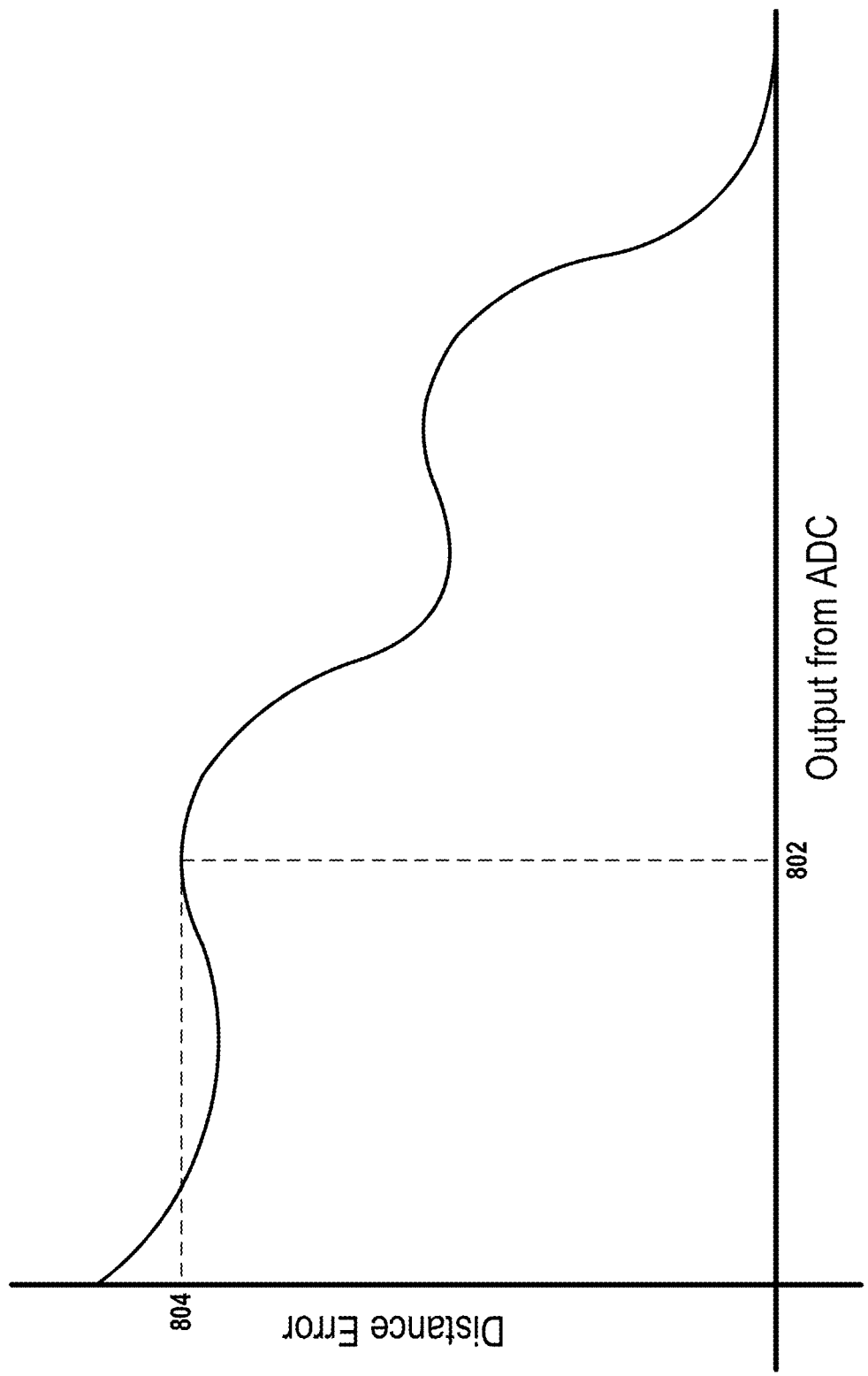

RANGE CALIBRATION OF LIGHT DETECTORS

CROSS-REFERENCE TO RELATED APPLICATIONS

The present application is a continuation application claiming priority to U.S. patent application Ser. No. 16/445,394, filed Jun. 19, 2019; which claims priority to provisional U.S. Patent Application No. 62/814,042, filed Mar. 5, 2019; the contents of each of which are hereby incorporated by reference in their entirety.

BACKGROUND

The present application is a continuation application claiming priority to U.S. patent application Ser. No. 16/445,394, filed Jun. 19, 2019, now U.S. Pat. No. 11,681,030, which claims priority to provisional U.S. Patent Application No. 62/814,042, filed Mar. 5, 2019; the contents of each of which are hereby incorporated by reference in their entirety.

Light detection and ranging (LIDAR) devices may estimate distances to objects in a given environment. For example, an emitter subsystem of a LIDAR device may emit near-infrared light pulses, which may interact with objects in the device's environment. At least a portion of the light pulses may be redirected back toward the LIDAR (e.g., due to reflection or scattering) and detected by a detector subsystem. Conventional detector subsystems may include a plurality of detectors and a corresponding controller configured to determine an arrival time of the respective light pulses with high temporal resolution (e.g., ~400 ps). The distance between the LIDAR device and a given object may be determined based on a time of flight of the corresponding light pulses that interact with the given object.

SUMMARY

The disclosure relates to range calibration for light detectors (e.g., light detectors within a LIDAR device). Using pulse analysis methods to determine the transit time of a light signal emitted/detected in a LIDAR device may lead to errors in the determined distance to an object based on the intensity of the reflected light signal. This is sometimes referred to as "walk error." In order to calibrate for the walk error, a calibration target that has a variety of regions with different reflectivities may be used. The LIDAR device may transmit a series of light signals toward the various regions of the calibration target and then detect a series of reflections from the calibration target. Using the apparent range of the detected signals, the intensities of the reflected signals, and the actual range to the calibration target, calibration data used to compensate for walk error in the respective light detector can be generated.

In one aspect, a method is provided. The method includes emitting, from a transmitter of a light detection and ranging (LIDAR) device, a first light signal toward a first region of a calibration target having a first reflectivity. The method also includes detecting, by a detector of the LIDAR device, a reflection of the first light signal from the first region of the calibration target. The detected reflection of the first light signal has a first intensity. Further, the method includes emitting, from the transmitter of the LIDAR device, a second light signal toward a second region of the calibration target having a second reflectivity. In addition, the method includes detecting, by the detector of the LIDAR device, a reflection of the second light signal from the second region of the calibration target. The detected reflection of the second light signal has a second intensity. The second intensity is different than the first intensity. Still further, the method includes determining a first apparent range between the LIDAR device and the calibration target based on the detected reflection of the first light signal. Additionally, the method includes determining a second apparent range between the LIDAR device and the calibration target based on the detected reflection of the second light signal. The second apparent range is different than the first apparent range. Even further, the method includes generating walk-error calibration data for the detector based on the first apparent range, the second apparent range, the first intensity, the second intensity, and an actual range between the LIDAR device and the calibration target.

In another aspect, a calibration system for calibrating a light detection and ranging (LIDAR) device is provided. The calibration system includes a calibration target having a surface with at least six reflective regions. Each reflective region has a different, known reflectivity, to provide a range of reflectivities that includes at least one reflectivity that is less than 10 percent and at least one reflectivity that is greater than 90 percent. The calibration target is positioned relative to the LIDAR device such that a transmitter of the LIDAR device is able to emit a respective light signal toward each reflective region of the calibration target and a detector of the LIDAR device is able to detect a reflection of each respective light signal from each reflective region of the calibration target, with each detected reflection having a different intensity and one or more detected reflections having an apparent range that differs from an actual range between the LIDAR device and the calibration target.

In an additional aspect, a method is provided. The method includes generating respective walk-error calibration data for each of a plurality of transmitter and detector pairs in a light detection and ranging (LIDAR) device. Generating respective walk-error calibration data for each of the plurality of transmitter and detector pairs in the LIDAR device includes emitting a first light signal from the transmitter. Generating respective walk-error calibration data for each of the plurality of transmitter and detector pairs in the LIDAR device also includes detecting, by the detector, a reflection of the first light signal from a first region of a calibration target having a first reflectivity. The detected reflection of the first light signal has a first intensity. Further, generating respective walk-error calibration data for each of the plurality of transmitter and detector pairs in the LIDAR device includes determining a first apparent range between the LIDAR device and the calibration target based on the detected reflection of the first light signal. Even further, generating respective walk-error calibration data for each of the plurality of transmitter and detector pairs in the LIDAR device includes emitting a second light signal from the transmitter. Additionally, generating respective walk-error calibration data for each of the plurality of transmitter and detector pairs in the LIDAR device includes detecting, by the detector, a reflection of the second light signal from a second region of the calibration target having a second reflectivity. The detected reflection of the second light signal has a second intensity. The second intensity is different than the first intensity. Yet further, generating respective walk-error calibration data for each of the plurality of transmitter and detector pairs in the LIDAR device includes determining a second apparent range between the LIDAR device and the calibration target based on the detected reflection of the second light signal. The second apparent range is different than the first apparent range. Still yet further, generating respective walk-error calibration data for each of the plurality of transmitter and detector pairs in the LIDAR device includes generating walk-error calibration data based on the first apparent range, the second apparent range, the first intensity, the second intensity, and an actual range between the LIDAR device and the calibration target. The method also includes adjusting the respective walk-error calibration data for each of the plurality of transmitter and detector pairs. Adjusting the respective walk-error calibration data for each of the plurality of transmitter and detector pairs includes emitting recalibration light signals from each transmitter in the LIDAR device. The recalibration light signals are each directed at a single object within an environment of the LIDAR device. Adjusting the respective walk-error calibration data for each of the plurality of transmitter and detector pairs also includes detecting, by each of the detectors, reflections of the recalibration light signals from the single object within the environment. Each of the reflections has a respective intensity. Further, adjusting the respective walk-error calibration data for each of the plurality of transmitter and detector pairs also includes determining, based on the walk-error calibration data for each respective transmitter and detector pair and the respective intensities for each of the detected reflections of the recalibration light signals, respective compensated ranges to the single object within the environment for each of the transmitter and detector pairs. Additionally, adjusting the respective walk-error calibration data for each of the plurality of transmitter and detector pairs also includes modifying one or more of the respective walk-error calibration data based on the compensated ranges and the walk-error calibration data.

In yet another aspect, a method is provided. The method includes emitting, from a light emitter, a first light signal having a first intensity. The method also includes attenuating, using a variable attenuator, the first light signal to a second intensity. Further, the method includes detecting, by a detector of a light detection and ranging (LIDAR) device, the first light signal at the second intensity. Additionally, the method includes capturing a first output from an analog-to-digital converter (ADC) associated with the detector of the LIDAR device based on the detected first light signal at the second intensity. Yet further, the method includes emitting, from the light emitter, a second light signal having the first intensity. In addition, the method includes attenuating, using the variable attenuator, the second light signal to a third intensity. The third intensity is different from the second intensity. Still further, the method includes detecting, by the detector of the LIDAR device, the second light signal at the third intensity. Even further, the method includes capturing a second output from the ADC associated with the detector of the LIDAR device based on the detected second light signal at the third intensity. Yet even further, the method includes generating intensity calibration data for the detector based on the second intensity, the first output from the ADC, the third intensity, and the second output from the ADC.

These as well as other aspects, advantages, and alternatives will become apparent to those of ordinary skill in the art by reading the following detailed description, with reference, where appropriate, to the accompanying drawings.

BRIEF DESCRIPTION OF THE DRAWINGS

FIG. 4B is an illustration of a response curve, according to example embodiments.

FIG. 4C is a block diagram of an intensity calibration system, according to example embodiments.

FIG. 5A is an illustration of a series of reflected signals with respect to time, according to example embodiments.

FIG. 6 is an illustration of a calibration target, according to example embodiments.

FIG. 8A is an illustration of distance error with respect to peak output from a detector, according to example embodiments.

DETAILED DESCRIPTION

Figure 1:
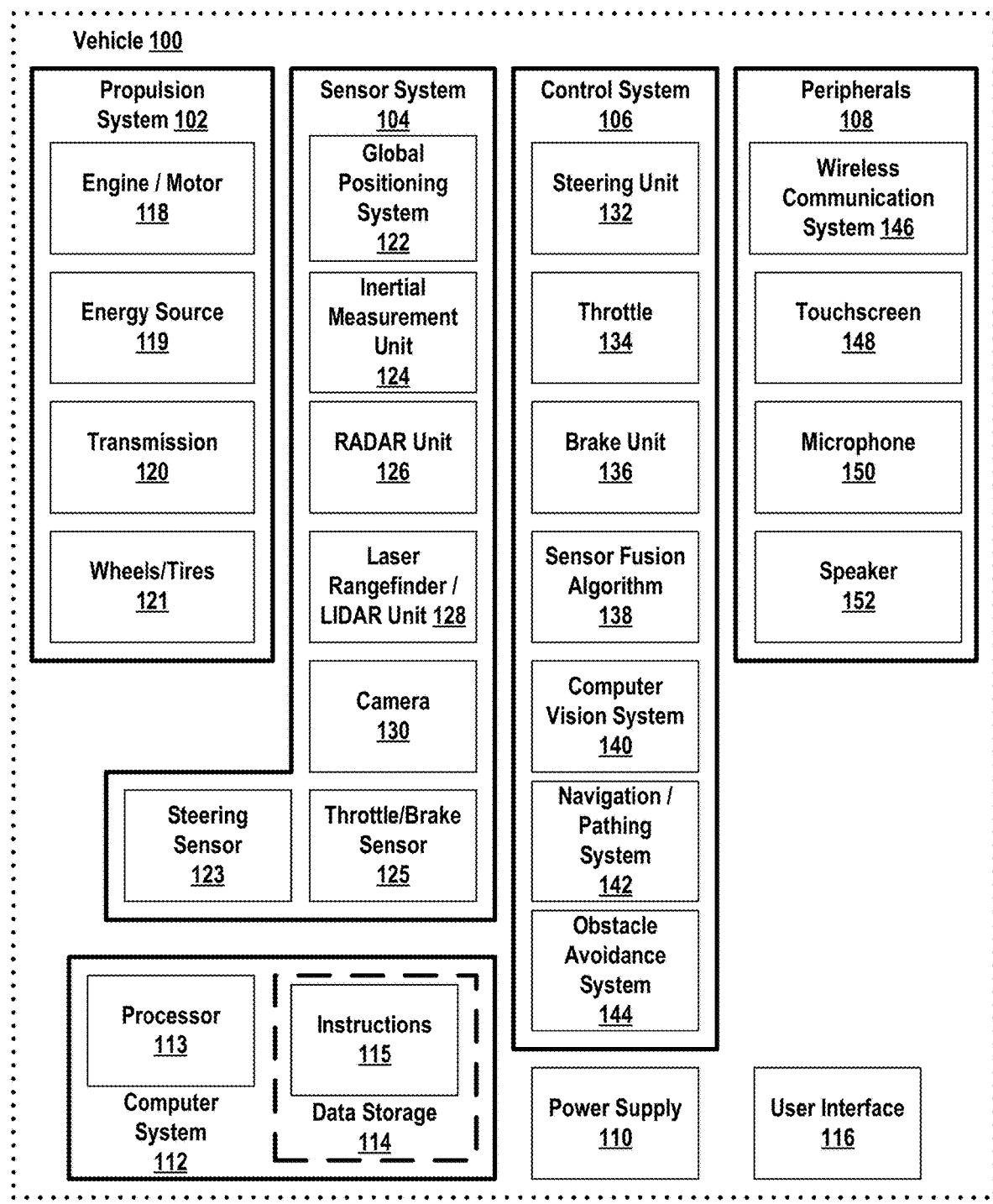
FIG. 1 is a functional block diagram illustrating a vehicle, according to example embodiments.
Figure 2A:
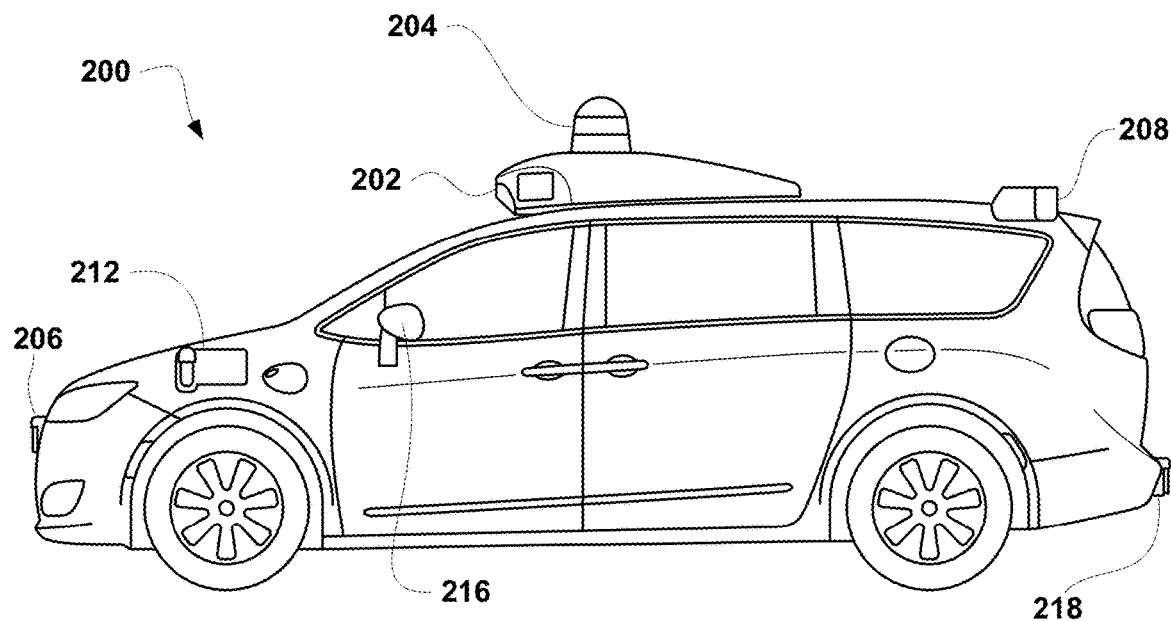
FIG. 2A is an illustration of a physical configuration of a vehicle, according to example embodiments.
Figure 2B:
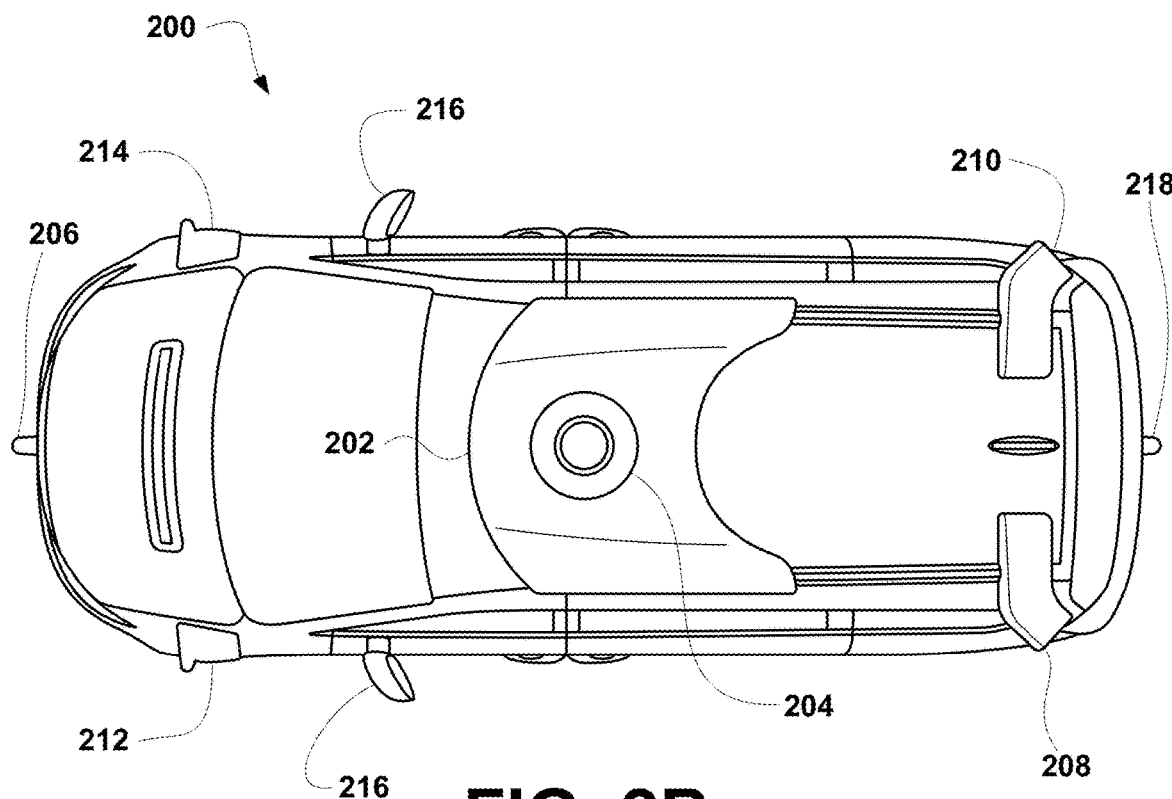
FIG. 2B is an illustration of a physical configuration of a vehicle, according to example embodiments.
Figure 2C:
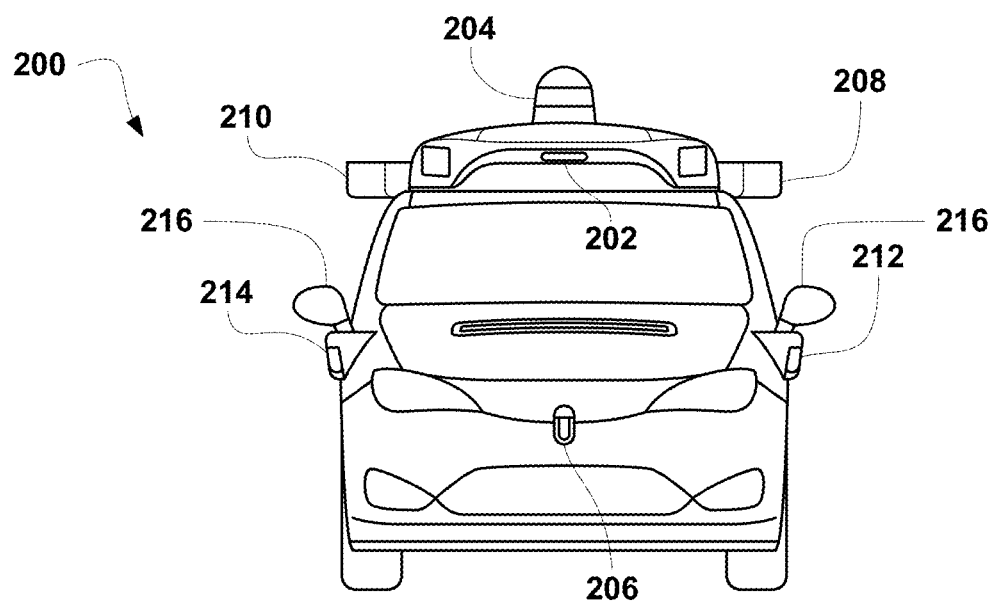
FIG. 2C is an illustration of a physical configuration of a vehicle, according to example embodiments.
Figure 2D:
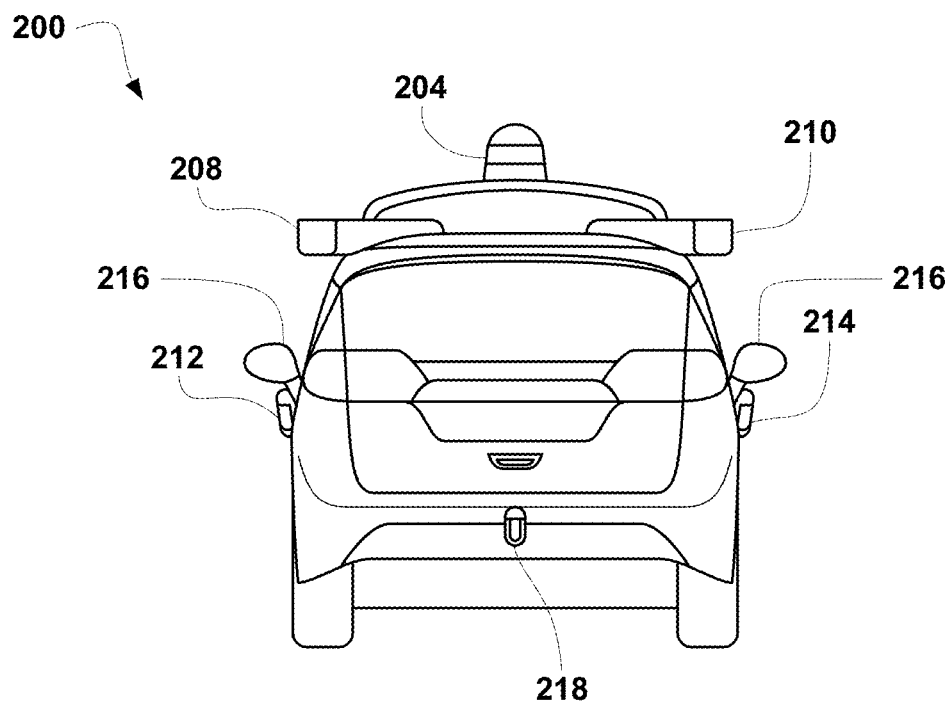
FIG. 2D is an illustration of a physical configuration of a vehicle, according to example embodiments.
Figure 2E:
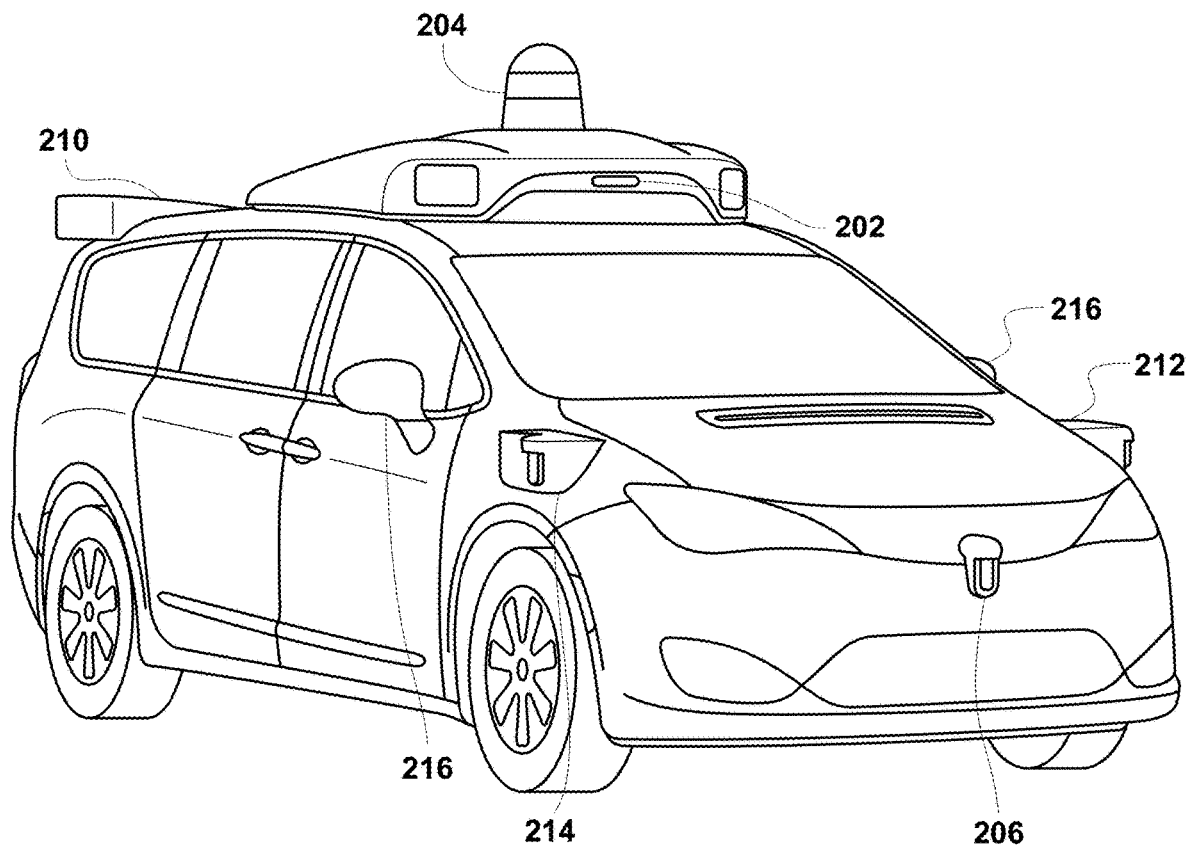
FIG. 2E is an illustration of a physical configuration of a vehicle, according to example embodiments.

Example methods and systems are contemplated herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. Further, some of the illustrated elements may be combined or omitted. Yet further, an example embodiment may include elements that are not illustrated in the figures.

I. Overview

LIDAR devices may determine the range to a given object in a surrounding environment by determining the time of flight between a transmitted light signal and a detected reflection. The transmitted light signal may include a light pulse (e.g., emitted from a pulsed laser source). Determining time of flight of the corresponding light pulses may include determining a time difference between the time when a light pulse is emitted from the LIDAR device and the receive time when a reflected light pulse reflected by the object is received by the LIDAR device. Typically, the reflected light pulse has a rising edge that increases to a maximum value followed by a falling edge. In some cases, the receive time may be taken as the peak time when the maximum value in the reflected light pulse occurs. To find the peak time, the time derivative of the reflected pulse may be determined. The time when the zero-crossing occurs in the derivative of the reflected light pulse corresponds to the time when the reflected light pulse is at its maximum value. In practice, the zero-crossing may be determined based on when the time derivative falls below some small threshold value (e.g., as determined by a comparator). The comparator output may trigger a time determination and may also trigger an analog-to-digital (ADC) conversion of the peak value of the reflected light pulse. In this way, the receive time corresponding to when the peak value occurs and an ADC value corresponding to the peak value can be determined for each reflected light pulse.

The use of a threshold value in the time derivative to determine the zero-crossing can add a small amount of error in determining when the peak value occurs. Specifically, the time derivative will fall below the threshold slightly before the zero-crossing occurs, thereby underestimating the receive time and the resulting range to the object. Perhaps more problematically, the magnitude of the error increases as the intensity of the reflected pulse decreases. The intensity of the reflected pulse can be, in turn, a function of the reflectivity of the object. Thus, objects that are the same distance away from the LIDAR device but have different reflectivities may appear to have different ranges, with higher reflectivity objects appearing to be farther away than lower reflectivity objects. This intensity-dependent range error is often referred to as "walk error."

To compensate for the walk error, a set of calibration data (e.g., in the form of a calibration curve) that relates the range error to the reflected pulse intensity (e.g., output value from an ADC) can be determined for a detector (and, potentially, for each detector of a LIDAR device). The calibration data can be determined using a specially designed calibration target that includes regions with different reflectivities. In some embodiments, the calibration target may cover the full range of reflectivities (e.g., to the extent practical, so as to cover the broadest dynamic range of detectable intensities for a given detector being calibrated). Thus, the calibration target may include one or more regions with nearly 0% reflectivity, one or more regions with nearly 100% reflectivity, and regions that cover a range of reflectivies between 0% and 100%.

To generate the calibration data, the calibration target may be placed some distance away from the LIDAR device (e.g., 20 meters away) and the LIDAR device may be operated to scan over the entire target so as to sample the full range of reflectivies. It is also possible to use the returns from the edges of the target to obtain very low intensity reflected light pulses. In this way, the LIDAR device can sample reflected light pulses with an even wider range of intensities. The range errors for the different intensities can then be determined to generate calibration data for the LIDAR device. Generating the calibration data may also include using interpolation, extrapolation, and/or regression techniques to generate a calibration curve. For a LIDAR device that includes multiple detectors, the calibration target may be scanned using each of the detectors to generate a separate calibration curve for each detector. Further, the LIDAR device may be placed on a tip/tilt stage to scan the target.

After determining the calibration data, though, the behavior of the detector may drift from the previously characterized behavior captured by the calibration data (e.g., after hours, days, weeks, months, or years of use). One way to account for this would be to simply re-determine the calibration data for the detector using the calibration target ab initio. However, this may not always be practical, particularly if the LIDAR device has been fitted, assembled, or attached as a component of a larger system (e.g., mounted to a vehicle) since the original calibration was performed. In such cases, disassembling all or part of such a system simply to recalibrate the LIDAR device may be undesirable.

An alternative way of identifying the present walk error corresponding to a particular detector may include comparing its behavior to the behavior of other detectors in an ensemble of detectors for a common target in the environment. Such a technique may alternatively be referred to herein as a "check-up calibration," a "recalibration," or a "confirmation calibration." Such a recalibration may be performed, for example, in a LIDAR device configured to scan a scene using multiple light signals (i.e., multi-channel LIDAR). The recalibration may involve transmitting light signals toward an object in the environment by detecting reflections of the transmitted light signals via separate transmit/receive channels. During operation, such a LIDAR device may be mounted to a vehicle and taking measurements as the vehicle moves through the environment.

An example recalibration as described above may include validating and/or adjusting the intensity-range calibration for a given channel of the LIDAR by comparing the return signal intensities of the given channel when scanning any target in the environment from a plurality of distances (i.e., as the vehicle moves in the environment) with the average of return signal intensities of other channels that scan the same target from multiple distances as the vehicle moves.

With this arrangement, run-time calibration of the intensity-range characteristic of a given channel (i.e., transmitter/detector pair) can be performed without using a specially designed target that is moved to multiple ranges. In particular, the given channel's intensity-range response behavior can be compared to the average of the other channels that scanned the same region of the environment under substantially similar conditions. Further, with this arrangement, the system can detect and/or characterize a variation of the behavior of the given channel (during operation of the LIDAR device) from an expected behavior characterized during an initial calibration (i.e., when the specially designed calibration target was used).

II. Example Systems

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. In some embodiments, vehicle 100 may also include subsystems that enable a driver to control operations of vehicle 100.

As shown in FIG. 1, vehicle 100 may include various subsystems, such as propulsion system 102, sensor system 104, control system 106, one or more peripherals 108, power supply 110, computer system 112 (could also be referred to as a computing system), data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, laser rangefinder/LIDAR 128, camera 130, steering sensor 123, and throttle/brake sensor 125, among other possible sensors. In some embodiments, sensor system 104 may also include sensors configured to monitor internal systems of the vehicle 100 (e.g., 02 monitor, fuel gauge, engine oil temperature, brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the local environment of vehicle 100. As such, radar 126 may include antennas configured to transmit and receive radio signals. In some embodiments, radar 126 may correspond to a mountable radar system configured to obtain measurements of the surrounding environment of vehicle 100.

Laser rangefinder/LIDAR 128 may include one or more laser sources, a laser scanner, and one or more detectors, among other system components, and may operate in a coherent mode (e.g., using heterodyne detection) or in an incoherent detection mode. In some embodiments, the one or more detectors of the laser rangefinder/LIDAR 128 may include one or more photodetectors. Such photodetectors may be especially sensitive detectors (e.g., avalanche photodiodes (APDs)). In some examples, such photodetectors may even be capable of detecting single photons (e.g., single-photon avalanche diodes (SPADs)). Further, such photodetectors can be arranged (e.g., through an electrical connection in series) into an array (e.g., as in a silicon photomultiplier (SiPM)).

Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., traffic lights, roadway boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or 4G cellular communication, such as worldwide interoperability for microwave access (WiMAX) or long-term evolution (LTE). Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E shows an example vehicle 200 that can include some or all of the functions described in connection with vehicle 100 in reference to FIG. 1. Although vehicle 200 is illustrated in FIGS. 2A-2E as a van for illustrative purposes, the present disclosure is not so limited. For instance, the vehicle 200 can represent a truck, a car, a semi-trailer truck, a motorcycle, a golf cart, an off-road vehicle, a farm vehicle, etc.

The example vehicle 200 includes a sensor unit 202, a first LIDAR unit 204, a second LIDAR unit 206, a first radar unit 208, a second radar unit 210, a first LIDAR/radar unit 212, a second LIDAR/radar unit 214, and two additional locations 216, 218 at which a radar unit, LIDAR unit, laser rangefinder unit, and/or other type of sensor or sensor(s) could be located on the vehicle 200. Each of the first LIDAR/radar unit 212 and the second LIDAR/radar unit 214 can take the form of a LIDAR unit, a radar unit, or both.

Furthermore, the example vehicle 200 can include any of the components described in connection with vehicle 100 of FIG. 1. The first and second radar units 208, 210 and/or the first and second LIDAR units 204, 206 can actively scan the surrounding environment for the presence of potential obstacles and can be similar to the radar 126 and/or laser rangefinder/LIDAR 128 in the vehicle 100.

The sensor unit 202 is mounted atop the vehicle 200 and includes one or more sensors configured to detect information about an environment surrounding the vehicle 200, and output indications of the information. For example, sensor unit 202 can include any combination of cameras, radars, LIDARs, range finders, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be movable in a scanning fashion within a particular range of angles and/or azimuths. The sensor unit 202 could be mounted atop the roof of a car, although other mounting locations are possible.

Additionally, the sensors of sensor unit 202 could be distributed in different locations and need not be collocated in a single location. Some possible sensor types and mounting locations include the two additional locations 216, 218. Furthermore, each sensor of sensor unit 202 can be configured to be moved or scanned independently of other sensors of sensor unit 202.

In an example configuration, one or more radar scanners (e.g., first and second radar units 208, 210) can be located near the rear of the vehicle 200, to actively scan the environment near the back of the vehicle 200 for the presence of radio-reflective objects. Similarly, the first LIDAR/radar unit 212 and the second LIDAR/radar unit 214 may be mounted near the front of the vehicle 200 to actively scan the environment near the front of the vehicle 200. A radar scanner can be situated, for example, in a location suitable to illuminate a region including a forward-moving path of the vehicle 200 without occlusion by other features of the vehicle 200. For example, a radar scanner can be embedded in and/or mounted in or near the front bumper, front headlights, cowl, and/or hood, etc. Furthermore, one or more additional radar scanning devices can be located to actively scan the side and/or rear of the vehicle 200 for the presence of radio-reflective objects, such as by including such devices in or near the rear bumper, side panels, rocker panels, and/or undercarriage, etc.

Although not shown in FIGS. 2A-2E, the vehicle 200 can include a wireless communication system. The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 can include a camera, possibly at a location inside sensor unit 202. The camera can be a photosensitive instrument, such as a still camera, a video camera, etc., that is configured to capture a plurality of images of the environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the environment. To this end, the camera may use one or more range detecting techniques. For example, the camera can provide range information by using a structured light technique in which the vehicle 200 illuminates an object in the environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
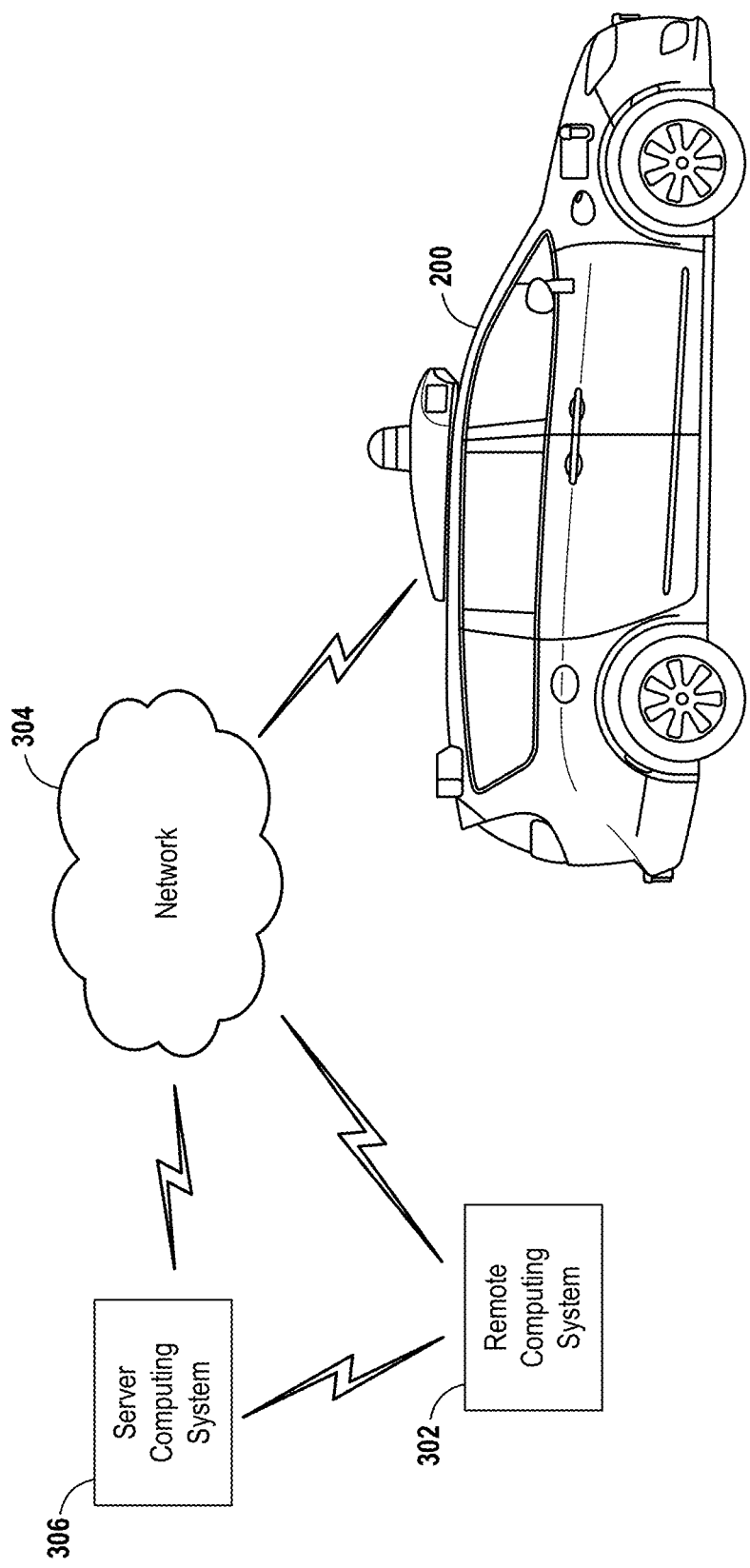
FIG. 3 is a conceptual illustration of wireless communication between various computing systems related to an autonomous vehicle, according to example embodiments.

FIG. 3 is a conceptual illustration of wireless communication between various computing systems related to an autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous mode that enables a control system to safely navigate vehicle 200 between destinations using sensor measurements. When operating in an autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, or a computing system local to vehicle 200) may operate to use a camera to capture images of the environment of an autonomous vehicle. In general, at least one computing system will be able to analyze the images and possibly control the autonomous vehicle.

In some embodiments, to facilitate autonomous operation a vehicle (e.g., vehicle 200) may receive data representing objects in an environment in which the vehicle operates (also referred to herein as "environment data") in a variety of ways. A sensor system on the vehicle may provide the environment data representing objects of the environment. For example, the vehicle may have various sensors, including a camera, a radar unit, a laser range finder, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar unit may be configured to transmit an electromagnetic signal that will be reflected by various objects near the vehicle, and then capture electromagnetic signals that reflect off the objects. The captured reflected electromagnetic signals may enable the radar system (or processing system) to make various determinations about objects that reflected the electromagnetic signal. For example, the distances to and positions of various reflecting objects may be determined. In some embodiments, the vehicle may have more than one radar in different orientations. The radar system may be configured to store captured information to a memory for later processing by a processing system of the vehicle. The information captured by the radar system may be environment data.

In another example, a laser range finder may be configured to transmit an electromagnetic signal (e.g., infrared light, such as that from a gas or diode laser, or other possible light source) that will be reflected by target objects near the vehicle. The laser range finder may be able to capture the reflected electromagnetic (e.g., laser) signals. The captured reflected electromagnetic signals may enable the range-finding system (or processing system) to determine a range to various objects. The laser range finder may also be able to determine a velocity or speed of target objects and store it as environment data.

Additionally, in an example, a microphone may be configured to capture audio of environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the environment of the vehicle. For example, the processing system may combine data from both radar information and a captured image to determine if another vehicle or pedestrian is in front of the autonomous vehicle. In other embodiments, other combinations of sensor data may be used by the processing system to make determinations about the environment.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the environment (e.g., if there is actually a stop sign or if there is actually no stop sign present), (ii) confirm whether the vehicle's identification of the object is correct, (iii) correct the identification if the identification was incorrect and/or (iv) provide a supplemental instruction (or modify a present instruction) for the autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the environment to determine at least one object having a detection confidence below a threshold. A processor in the vehicle may be configured to detect various objects of the environment based on environment data from various sensors. For example, in one embodiment, the processor may be configured to detect objects that may be important for the vehicle to recognize. Such objects may include pedestrians, street signs, other vehicles, indicator signals on other vehicles, and other various objects detected in the captured environment data.

The detection confidence may be indicative of a likelihood that the determined object is correctly identified in the environment, or is present in the environment. For example, the processor may perform object detection of objects within image data in the received environment data, and determine that the at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the environment in various ways depending on the source of the environment data. In some embodiments, the environment data may come from a camera and be image or video data. In other embodiments, the environment data may come from a LIDAR unit. The vehicle may analyze the captured image or video data to identify objects in the image or video data. The methods and apparatuses may be configured to monitor image and/or video data for the presence of objects of the environment. In other embodiments, the environment data may be radar, audio, or other data. The vehicle may be configured to identify objects of the environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the environment, it may also calculate a confidence associated with the specific detected object. The confidence may be calculated in various ways depending on the embodiment. In one example, when detecting objects of the environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some embodiments, via a server (e.g., server computing system 306). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of vehicle (e.g., a speed and/or direction), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

Figure 4A:
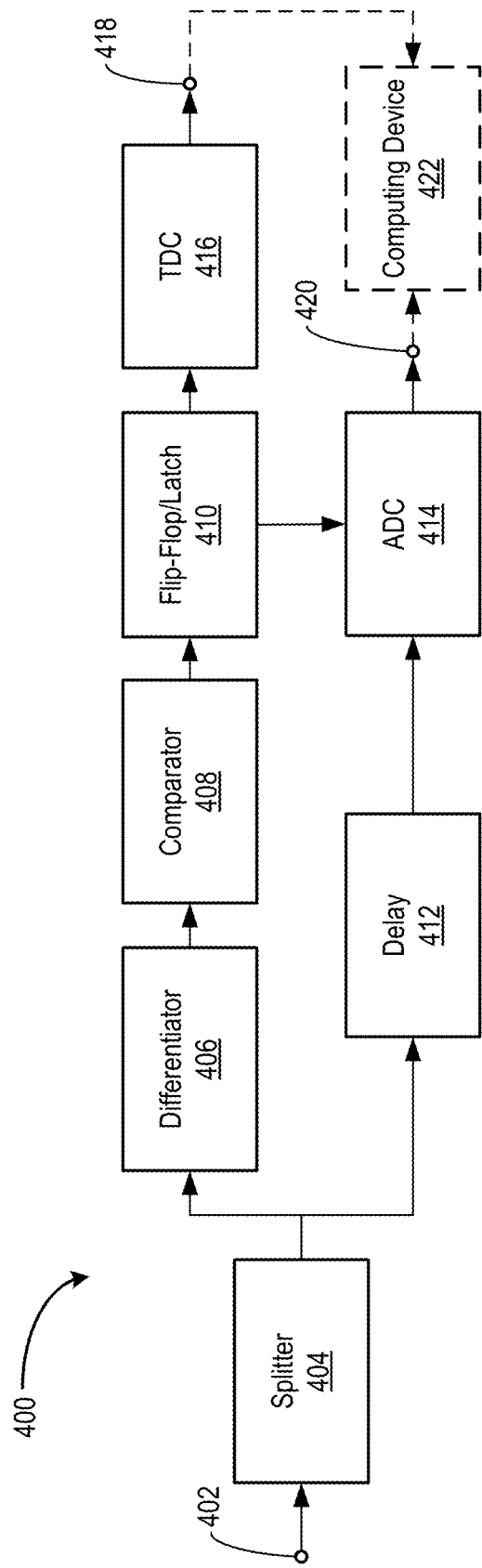
FIG. 4A is a block diagram of a pulse detection device, according to example embodiments.

FIG. 4A is a simplified flow diagram of a pulse detection device 400, according to example embodiments. The pulse detection device 400 may be a part of a LIDAR device (e.g., the LIDAR 128 illustrated in FIG. 1). In one example, the pulse detection device 400 may be coupled to and controlled by a computing device associated with the LIDAR device (e.g., the computer system 112 illustrated in FIG. 1, the remote computing system 302 illustrated in FIG. 3, and/or the server computing system 306 illustrated in FIG. 3).

As shown, the pulse detection device 400 includes an input 402, a signal splitter 404, a differentiator 406, a comparator 408, a flip-flop/latch 410, a time-to-digital converter (TDC) 416, a delay 412, an ADC 414, and digital outputs 418 and 420. In one example, the input 402 may be configured to receive an analog input signal representative of reflected light, as previously discussed. In this example, the input 402 may be coupled to the output of a photo-detector configured to receive the reflected light. In some cases, the input 402 may be coupled to the output of the photo-detector via a signal processor where the output of the photo-detector is filtered and amplified to provide to the input 402 a cleaner input signal with improved signal-to-noise ratio.

The signal splitter 404 is coupled to the input 402 and is configured to direct a first portion of the input signal to the differentiator 406 and a second portion of the input signal to the delay 412. The signal splitter 404 could be, for example, a passive circuit component, an active circuit component, or a combination of passive and active circuit components that can output two substantially identical portions of the analog signal received at input 402.

The differentiator 406 may then receive the first portion of the analog signal from the splitter 404 and accordingly provide a differentiated signal (i.e., a signal differentiated with respect to time). In one example, the differentiator 406 may be a circuit including a high input impedance operational amplifier coupled to an input capacitor and a feedback resistor. In this example, the current flowing through the capacitor may be proportional to the time derivative of the voltage across the capacitor, and a voltage output proportional to the time derivative of the voltage may be generated from the current flowing through the feedback resistor. In another example, the differentiator 406 may be a passive resistor-capacitor (RC) circuit including a capacitor in series with the input and an output resistor. Other circuit designs for the differentiator 406 may also be possible.

The comparator 408 may then receive the differentiated signal from the differentiator 406 and provide an output indicating whether the differentiated signal is positive (input signal is increasing) or negative (input signal is decreasing). In one example, the comparator 408 may include an operational amplifier having one input coupled to ground and the other input coupled to the differentiator 406 to receive the differentiated signal. In operation, the comparator 408 may then provide an output of 1 ("on") if the differentiated signal is greater than 0, at ground, or 0 ("off") if the differentiated signal is less than 0. Accordingly, a transition from 1 to 0 or from 0 to 1 in the output of the comparator 408 may indicate a zero-crossing in the differentiated signal. Other circuit designs for the comparator 408 may also be possible.

The output of the comparator 408 may then be provided to the flip-flop/latch 410, which may be one of a number of different flip-flop or latch circuits, such as a set-and-reset latch, a gated latch, or a D flip-flop. In one example, the flip-flop/latch 410 may be configured to store a previous input (or state) and provide an output based on both the previous input and a current input. As applicable to the pulse detection device 400, the flip-flop/latch 410 may be configured to provide a 1 ("on") output if consecutive inputs to the flip-flop/latch 410 transitioned from 1 to 0, and provide a 0 ("off") output otherwise. As such, the flip-flop/latch 410 may output a 1 when a zero-crossing, indicating a peak of a pulse in the analog input signal is detected. Other circuit configurations for the flip-flop/latch 410 may also be possible.

As shown in FIG. 4A, outputs from the flip-flop/latch 410 may be provided as inputs to both the TDC 416 and the ADC 414. In one example, the TDC 416 may be configured to provide a digital output 418 representing a time in response to outputs from the flip-flop/latch 410. In one case, the time may be a duration between a reference time and when an output of 1 is received from the flip-flop/latch 410. As applicable to a LIDAR device, the reference time may be a time when a generated light pulse corresponding to the detected light pulse reflected from the object in the surrounding environment is provided by the LIDAR device. The TDC 416 may include a high frequency counter that may be configured to begin incrementing when the generated light pulse is provided, and output the value of the counter as a time measurement when the output of 1 is received from the flip-flop/latch 410. In some cases, the TDC 416 may further include time interpolation capabilities to provide representations of time with added precision, if the frequency of the counter is insufficient. Other configurations for the TDC 416 may also be possible.

In addition to receiving the output from the flip-flop/latch 410, the ADC 414 as shown in FIG. 4A may also receive an output from the delay 412. As previously discussed, the delay 412 may be configured to provide a time-delayed version of the input analog signal such that a point in the time-delayed analog signal corresponds to an output of the flip-flop/latch 410 resulting from the same point in the original analog signal. As shown, the delay 412 may receive the second portion of the input analog signal from the input 402 and accordingly provide the time-delayed analog signal to the ADC 414. In one example, the delay 412 may include a series of signal buffers and/or inverters to create a time-delay between receiving the analog input signal and providing the now time-delayed analog signal. In another example, the delay 412 may involve circuitry to hold the analog input signal while a high frequency counter increments to a predetermined delay amount before outputting the time-delayed analog signal. Other configurations for the delay 412 may also be possible.

The ADC 414 may be configured to then take a measurement of the time-delayed analog signal in response to the output of 1 from the flip-flop/latch 410 and provide a digital output 420. Given that the delay 412 provides a time-delayed version of the input analog signal such that a point in the time-delayed analog signal corresponds to an output of the flip-flop/latch 410 resulting from the same point in the original analog signal, the measurement of the time-delayed analog signal will correspond to a magnitude or value at the peak of the detected pulse. In one example, the ADC 414 may include an array of comparators configured to sample the time-delayed analog signal and output an incremented, digital representation of the value of the time-delayed analog signal. Other implementations of the ADC 414 may also be possible.

As shown in FIG. 4A, the output 418 corresponds to the time measurement output from the TDC 416 and the output 420 corresponds to the magnitude measurement of the pulse in the time-delayed analog signal from the ADC 414. The outputs 418 and 420 may then be provided to a computing device 422 for further processing to determine information on an object in the environment from which the detected pulse in the analog input signal was reflected. Computing device 422 may determine information such as a distance of the object from the LIDAR device based on the time measurement received from the TDC 416 (output 418), and information such as a texture or reflectance of the object may be determined based on the magnitude measurement of the pulse received from the ADC 414 (output 420).

The examples discussed above in connection to pulse detection device 400 shown in FIG. 4A provide some embodiments for dynamic measurements of pulse peak values, one having ordinary skill in the art will appreciate that variations of the discussed embodiments, within the scope of the present application are also possible.

For example, a time associated with the measurement of the pulse peak value may not be needed. This may be the case when another component in the LIDAR device is configured to determine distances of objects in the surrounding environment. As such, TDC 416 may be removed from pulse detection device 400. Similarly, in another case, if another component in the LIDAR device is configured to determine the pulse peak value, ADC 414 may be removed from pulse detection device 400. In this case, the delay 412 may also be removed. Other variations are also be possible.

In some embodiments, LIDAR devices may be configured to measure not only the time delay in reflected signals to determine distance, but also the intensity of reflected signals. Measurements of the intensity of reflected signals may provide information about objects in the surrounding environment in addition to range. For example, the intensity of a reflected signal may provide information about the color of a surface of an object in the surrounding scene, a material coating the surface of the object in the surrounding scene (e.g., based on the reflectivity of the surface of the object), the orientation of an object in the surrounding scene, and/or whether the object in the surrounding scene and/or one of the imaging optics in the LIDAR device has a crack or other surface imperfection. For these reasons, among others, it can be beneficial to measure the intensity of reflected signals in addition to the time delay of reflected signals.

In some cases, in order to meaningfully evaluate the intensity of reflected signals, the detector of the LIDAR device (e.g., the pulse detection device 400) may be calibrated so the relationship between the output electrical signal (e.g., output 420 from the ADC 414) and the intensity of the light imparted on the detector (e.g., at the surface of a photodiode or SiPM) can be accurately deduced. This relationship can be used as intensity calibration data. Further, such a relationship is sometimes referred to as the "response" of the detector and may be characterized by a response curve (e.g., of input light intensity or power vs. output electrical signal from the detector). An example response curve is illustrated in FIG. 4B. The horizontal axis may correspond to incident light intensity on the detector and the vertical axis may correspond to output electrical signal (e.g., from the ADC 414). In many cases, as illustrated in FIG. 4B, the response curve may non-linear (e.g., this may be by design and/or due to inherent device properties of the detector). Further, due to semiconductor device physics and fabrication tolerances, the response curves of different detectors (even those fabricated in the same facility and/or using the same device specifications) may be different from one another. For these reasons, it can be beneficial to characterize the response of each detector individually (e.g., after fabrication and/or installation in the LIDAR device). The response curve can later be used in run-time to back out the actual intensity of an incident light signal based on the output electrical signal.

Some embodiments described herein include techniques used to determine the response curve illustrated in FIG. 4B. One such technique involves the use of an intensity calibration system 450. FIG. 4C is a block diagram of an example intensity calibration system 450, according to example embodiments. The intensity calibration system 450 may include a pulsed light source 452, a variable attenuator 454, and a light pulse detection device (e.g., the pulse detection device 400 illustrated in FIG. 4A).

The pulsed light source 452 may be a well-characterized light source, meaning that the characteristics of the light signal output by the pulsed light source 452 may be accurately and precisely predetermined. For example, the output wavelength, the peak output power of the light pulses, the frequency of light pulses, the pulse shape of light pulses, etc. may be predetermined for the pulsed light source 452. The pulsed light source 452 may include one or more pulsed lasers (e.g., a Q-switched laser). In alternate embodiments, a continuous wave (CW) light source may instead be used. Further, the pulsed light source 452 may be synchronized with the pulse detection device 400. For example, the pulsed light source 452 and the pulse detection device 400 may be referenced to a common clock signal. Such a synchronization may ensure that the precise timing of a waveform reaching the pulse detection device 400 from the pulsed light source 452 can be determined (e.g., regardless of any attenuation applied by the variable attenuator 454).

The variable attenuator 454 may be a well-characterized attenuator such that, in combination with a well-characterized pulsed light source 452, the intensity of the calibration signal output from the variable attenuator 454 may be precisely determined. A precisely determined intensity of the output calibration signal may be used to enhance the quality of a response curve (e.g., as illustrated in FIG. 4B) generated for the pulse detection device 400 using the intensity calibration system 450. In some embodiments, the variable attenuator 454 may include one or more variable neutral-density filters and/or a lossy length of optical fiber, for example.

Determining the response curve of FIG. 4B using the intensity calibration system 450 may include emitting a calibration signal using a well-characterized light source (e.g., the pulsed light source 452), passing the calibration signal through the variable attenuator 454, and detecting the calibration signal using the detector under test (e.g., the pulse detection device 400). The calibration signal may be a light signal at a given wavelength that is transmitted as a series of pulses. Further, the variable attenuator may attenuate the calibration signal (e.g., attenuate consecutive pulses of the calibration signal) at a series of levels. For example, the variable attenuator may attenuate the intensity of the calibration signal by 0%, then by 1%, then by 2%, then by 3%, then by 4%, etc., up to 100%. In alternate embodiments, the attenuation pattern may be more or less granular. Additionally or alternatively, in alternate embodiments the attenuation pattern may start at maximum attenuation (e.g., 100% attenuation) and then decrease, instead. Due to the series of attenuations, the intensity of the calibration signal as detected by the pulse detection device 400 will vary over a range of intensities. Based on this range of detected intensities, a response curve can be generated by the pulse detection device 400. In order to most accurately determine the response curve, the pulsed light source 452 and the pulse detection device 400 may be synchronized in time. Additionally, a phase difference (if any) between the pulsed light source 452 and the pulse detection device 400 may remain stable (or, if not stable, may be determined such that it can be accounted for) during the calibration measurement.

The response curve measured by the pulse detection device 400 (e.g., output from an analog-to-digital (ADC) converter of the pulse detection device 400) in response to the calibration signal may be recorded (e.g., stored within a non-transitory, computer-readable medium). This response curve may relate the value output from the pulse detection device 400 to the intensity of the calibration signal emitted by the pulsed light source 452 as modulated by the variable attenuator 454. As stated above, this response curve may be non-linear. In some embodiments, interpolation and/or regression may be performed to generate the response curve. Further, in some embodiments, a series of response curves may be generated for a series of different wavelengths of light (e.g., one response curve for red light, one response curve for green light, and one response curve for blue light). Such a series of response curves may be generated using a corresponding series of light sources or by modulating the calibration signal output by the pulsed light source 452.

The response curve may be stored (e.g., digitally) and later used at run-time (e.g., when capturing measurements of an environment surrounding the LIDAR device) to evaluate the intensity and/or power of a light signal reflected by an object in the surrounding environment to determine characteristics (e.g., surface qualities) of the respective object. In using the response curve to evaluate the intensity and/or power of a reflected signal, a non-linear response curve may be mapped to a linear approximation based on a small-signal slope of the detector at given operating parameters of the detector. Based on device specifications/semiconductor device physics, the small-signal slope of semiconductor detectors may be accurately characterized.

Figure 5B:
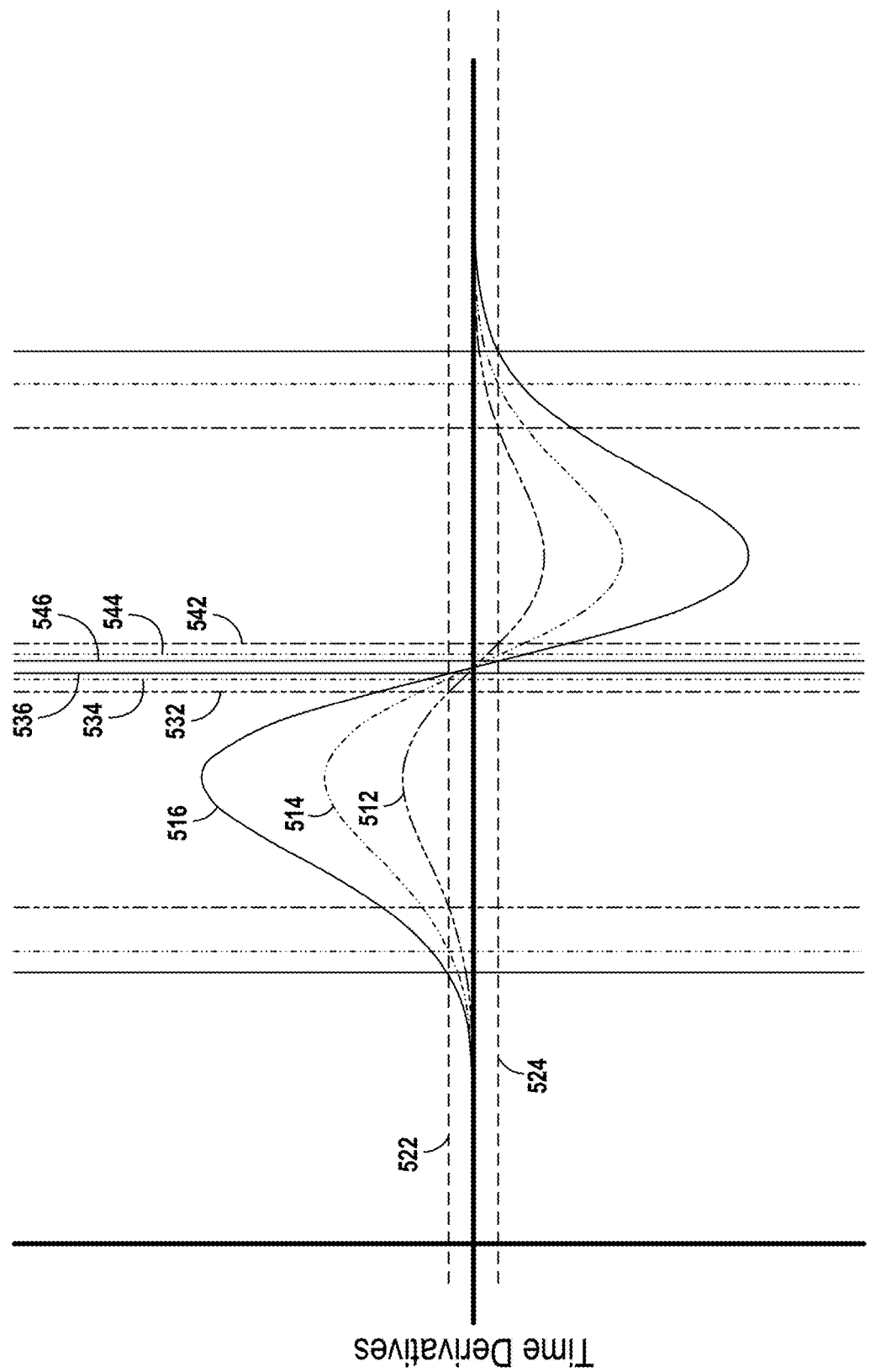
FIG. 5B is an illustration of the time derivatives of a series of reflected signals, according to example embodiments.

FIGS. 5A and 5B will now be discussed to more particularly illustrate one possible cause of walk error. FIG. 5A is an illustration of a series of reflected signals with respect to time, according to example embodiments. A first detected reflected signal 502 may correspond to a reflection having a low peak intensity, a second detected reflected signal 504 may correspond to a reflection having a middle peak intensity, and a third detected reflected signal 506 may correspond to a reflection having a high peak intensity. Each of the detected reflected signals 502, 504, 506 may correspond to a light pulse that is transmitted by a light source of a LIDAR device, reflected from an object in the environment surrounding the LIDAR device, and then detected by a pulse detection device (e.g., the pulse detection device 400 of FIG. 4A). As plotted, the detected reflected signals 502, 504, 506 may correspond to the output from an ADC (e.g., the ADC 414 illustrated in FIG. 4A).

The distance to the respective objects from which the light pulses are reflected in FIG. 5A is the same. Hence, the time 508 at which the respective detected reflected signals 502, 504, 506 reach their respective maxima is the same. The only difference among the respective detected reflected signals 502, 504, 506 is the intensity of the detected pulse. In other words, the transit time for the detected reflected signals 502, 504, 506 from the LIDAR device to the object in the environment and back again is the same, but the reflected intensity is different. Such a difference in reflected intensity may be due to different emitted intensities of the respective light signals from the LIDAR transmitter. Additionally or alternatively, differences in reflected intensity may be due to different reflectivities of the respective objects in the environment or due to differences in attenuation of the transmitted/reflected signals within the environment (e.g., due to fog, smoke, dust, rain, snow, etc.).

Because the distance to the objects in the three instances of the detected reflected signals 502, 504, 506 is the same, and the intensity maxima occur at the same time 508, any range to the respective objects determined by the LIDAR device should ideally be the same for each of the signals. One way of determining the range to an object involves differentiating the detected reflected signals 502, 504, 506 with respect to time (e.g., using the differentiator 406 illustrated in FIG. 4A) and then determining zero-crossings in the differentiated signal (e.g., as described above with reference to FIG. 4A).

FIG. 5B is an illustration of the time derivatives of the series of detected reflected signals in FIG. 5A, according to example embodiments. For example, a first time derivative signal 512 may correspond to the first detected reflected signal 502, a second time derivative signal 514 may correspond to the second detected reflected signal 504, and a third time derivative signal 516 may correspond to the third detected reflected signal 506. The time derivative signals 512, 514, 516 may be generated by a differentiator (e.g., the differentiator 406 illustrated in FIG. 4A). Also illustrated in FIG. 5B are a positive threshold 522 and a negative threshold 524. The positive threshold 522 and the negative threshold 524 may correspond to values of the time derivative that are sufficiently close to zero that crossing the thresholds 522, 524 may be used to determine an effective zero-crossing of the time derivative signals 512, 514, 516 (e.g., when the time derivative signals 512, 514, 516 drop below the positive threshold 522 or rise above the negative threshold 524). The thresholds 522, 524 may be predetermined (e.g., based on calibrations of zero-crossings using light signals of a standardized intensity and/or having a standardized waveform). In some embodiments, thresholds 522, 524 may be used rather than a value of zero to determine a zero-crossing in order to protect against false positives due to noise. If the actual zero-crossing were used, local maxima/minima in the detected reflected signals 502, 504, 506 due to small oscillations in intensity may be improperly detected as maximum intensity points based on zero-crossings in the time derivative signals 512, 514, 516.

Determinations of crossings of the thresholds 522, 524 in the time derivative signals 512, 514, 516 may be performed by a comparator (e.g., the comparator 408 illustrated in FIG. 4A). Further, the determinations of crossings of the thresholds 522, 524 may be performed using one or both of the rising edge and the falling edge of the time derivative signals 512, 514, 516. Still further, comparing the crossings of the thresholds 522, 524 for the rising edge and the falling edge to one another can be used to estimate pulse widths of the detected reflected signals 502, 504, 506. Pulse widths can be used in other calculations/calibrations (e.g., the determined pulse width can be compared to operational specifications for a transmitter of the LIDAR device to ensure the transmitter is functioning properly).

One source of walk-error, though, exists due to the crossings of the respective thresholds 522, 524 by the time derivative signals 512, 514, 516. All three detected reflected signals 502, 504, 506 reach maximum intensities at the same point in time (as illustrated in FIG. 5A), and therefore each of the time derivative signals 512, 514, 516 has a zero-crossing at the same point in time (as illustrated in FIG. 5B). However, because the waveforms of the detected reflected light signals 502, 504, 506 are different from one another, the times at which threshold crossings occur are not the same. As illustrated in FIG. 5B, the first time derivative signal 512 crosses the positive threshold 522 at a first time 532, the second time derivative signal 514 crosses the positive threshold 522 at a second time 534, and the third time derivative signal 516 crosses the positive threshold 522 at a third time 536. Similarly, the third time derivative signal 516 crosses the negative threshold 524 at a fourth time 546, the second time derivative signal 514 crosses the negative threshold 524 at a fifth time 544, and the first time derivative signal 512 crosses the negative threshold 524 at a sixth time 542.

Because the first time 532, the second time 534, and the third time 536 are not the same, evaluations made based on transit time of a light signal (e.g., distance to an object detected by a LIDAR system) would likewise be unequal. Further, the lower the intensity of the signal, the more pronounced the discrepancy between the actual zero-crossing and the crossing of the threshold becomes (e.g., the first detected reflected signal 502 has a lower intensity than the third detected reflected signal 506 and, correspondingly, the first time 532 is further from the actual zero-crossing time than the third time 536). This intensity-dependent error is sometimes referred to as "walk error," as described above. Other sources of walk error are also possible. To compensate for this walk error, calibration techniques as described herein may be performed.

FIG. 6 is an illustration of a calibration target 600, according to example embodiments. The calibration target 600 may be used to calibrate a detector of a LIDAR device. For example, the calibration target 600 may be positioned at a predetermined distance from the LIDAR device and a series of light signals may be: projected at the calibration target 600 by a transmitter of a LIDAR device, reflected from the calibration target 600, and detected by the detector of the LIDAR device (e.g., using the pulse detection device 400 illustrated in FIG. 4A). Using the waveforms of the detected, reflected light signals, a calibration measurement can be made by comparing the predetermined distance between the LIDAR device and the calibration target 600 to the apparent distance between the LIDAR device and the calibration target 600 based on the threshold crossing of a time derivative of the detected, reflected signal (e.g., similar to the time derivative signals 512, 514, 516 illustrated in FIG. 5B).

The calibration target 600 may include a first reflective region 602, a second reflective region 604, a third reflective region 606, a fourth reflective region 608, a fifth reflective region 610, a sixth reflective region 612, and one or more edges 614. Each of the reflective regions 602, 604, 606, 608, 610, 612 may have different reflectivities. In this way, a transmitter from a LIDAR device having a single output intensity can be used to generate signals with a range of reflected intensities by transmitting signals at different regions of the calibration target 600. For example, the intensities of the reflected signals could range from 1% to 99% of the output intensity of the transmitter of the LIDAR device. Because of the alignment between the transmitter and the detector in a transmitter/detector pair can affect the intensity of the reflected signal, it may be beneficial to perform a calibration of the detector using its paired transmitter as the light source (e.g., rather than a separate light source used solely for calibration). Further, the specific transmitter used may emit light signals having a unique intensity waveform, again making it beneficial to perform a calibration of the detector using its paired transmitter so the intensity waveform out the emitted light signal is the same in run-time as during calibration.

The first reflective region 602 may include a section of the calibration target 600 between the second reflective region 604 and the fifth reflective region 610, as illustrated. Further, the first reflective region 602 may also include an outer perimeter/border of the calibration target 600, as illustrated. In other embodiments, the first reflective region 602 may occupy other sections of the calibration target 600 (e.g., additional or fewer portions of the calibration target 600). The first reflective region 602 may have a reflectivity between 5% and 10%. For example, the first reflective region 602 may be black in color, such that it is primarily absorptive.

The second reflective region 604 may include an upper-left portion of the calibration target 600, as illustrated. In other embodiments, the second reflective region 604 may occupy other sections of the calibration target 600 (e.g., additional or fewer portions of the calibration target 600).

The second reflective region 604 may have a reflectivity between 95% and 100%. For example, the second reflective region 604 may include one or more retroreflective materials (e.g., corner reflectors).

The third reflective region 606 may include a lower-left portion of the calibration target 600, as illustrated. In other embodiments, the third reflective region 606 may occupy other sections of the calibration target 600 (e.g., additional or fewer portions of the calibration target 600). The third reflective region 606 may have a reflectivity between 15% and 20%. For example, the third reflective region 606 may be grey in color, such that it is primarily absorptive.

The fourth reflective region 608 may include a section of the calibration target 600 between the third reflective region 606 and the sixth reflective region 612, as illustrated. The fourth reflective region 608 may include low reflectivity portions interspersed with high reflectivity portions. For example, the fourth reflective region 608 may include a retroreflective material (e.g., the same retroreflective material as the second reflective region 604) partially covered by black tape (e.g., black masking tape). The width of the exposed retroreflective regions may constitute 1%, 5%, 10%, 15%, 20%, 25%, 30%, 35%, 40%, 45%, 50%, 55%, 60%, 65%, 70%, 75%, 80%, 85%, 90%, 95%, or 99% of the area of the fourth reflective region 608 relative to the black tape portions, for example. Other percentages are also possible.

The fifth reflective region 610 may include an upper-right portion of the calibration target 600, as illustrated. In other embodiments, the fifth reflective region 610 may occupy other sections of the calibration target 600 (e.g., additional or fewer portions of the calibration target 600). The fifth reflective region 610 may be primarily transmissive (e.g., may pass most of the light incident on the region through the region). As such, the fifth reflective region 610 may have a low reflectivity (e.g., between 1% and 5%). For example, the fifth reflective region 610 may include an optical window. In some embodiments, the optical window may be coated with an anti-reflection coating (e.g., a quarter-wave coating corresponding to the wavelength emitted by the transmitter of the LIDAR device) to further reduce the reflectivity of the optical window.

The sixth reflective region 612 may include a lower-right portion of the calibration target 600, as illustrated. In other embodiments, the sixth reflective region 612 may occupy other sections of the calibration target 600 (e.g., additional or fewer portions of the calibration target 600). In some embodiments, the sixth reflective region 612 may have a reflectivity between 60% and 80%. For example, the sixth reflective region 612 may include a piece of white paper.

In some embodiments, one or more of the reflective regions of a calibration target may be panels attached to a frame that defines a perimeter of the calibration target. In other embodiments, one or more of the reflective regions may be overlays mounted on a flat backing panel (e.g., a slab of glass or other transmissive material). In some embodiments, one or more of the reflective regions and/or other components of the calibration target may be surrounded (e.g., around the perimeter of the respective reflective region or component) by a low-reflectivity material (e.g., black gaffer tape) to prevent high-intensity returns from being generated (e.g., to maintain a wide range of usable reflectivities for calibration). This may be particularly useful at the mounting locations (e.g., where one or more of the reflective regions are adhered to a metallic frame and/or backing panel of the calibration target).

In some embodiments, one or more of the light signals emitted by the transmitter of the LIDAR device may be emitted toward an edge 614 of the calibration target 600. For example, the light signal may be emitted toward the edge 614 of the calibration target 600 such that only a portion of the light signal intersects the calibration target 600 and the non-intersecting portion continues past the calibration target 600 and is not reflected by the calibration target 600. In this way, the intensity of the detected, reflected signal could further be reduced, as a portion of the incident intensity is lost because it is not reflected by the calibration target 600. Thus, a wider range of reflected intensities may be accessible beyond solely the reflectivities of the respective reflective regions multiplied by the incident intensity of the light signal emitted by the transmitter of the LIDAR device.

In alternate embodiments, one or more of the reflective regions 602, 604, 606, 608, 610, 612 could have different shapes or sizes than illustrated in FIG. 6. For example, one or more of the reflective regions 602, 604, 606, 608, 610, 612 may be circular, triangular, pentagonal, hexagonal, etc. Additionally or alternatively, in some embodiments, one or more of the reflective regions 602, 604, 606, 608, 610, 612 may have a different size or shape than one or more of the other reflective regions 602, 604, 606, 608, 610, 612. For example, the first reflective region 602 may have a different size or shape than the second reflective region 604 in some embodiments. Further, in some embodiments, there may be greater or fewer than six reflective regions. Still further, the reflectivities of the respective reflective regions may be greater or less than described above (e.g., one or more of the reflective regions may be made of one or more different materials than described herein). Even further, in some embodiments, the reflective regions 602, 604, 606, 608, 610, 612 of the calibration target may be designed based on one or more characteristics of the transmitter of the LIDAR device to be tested (e.g., based on the emission wavelength of the transmitter of the LIDAR device).

In still other embodiments, the calibration target may instead include a continuum of reflectivity values (e.g., ranging continuously from 0% to 100%) rather than a discrete number of reflective regions each with different reflectivity values. Such a continuum may be fabricated using a material that is nearly 100% reflective covered by one or more neutral-density (ND) filters with a variety of transmissivities (e.g., continuously variable ND filters). Such a continuum may increase the number of intensity values possible for detected reflected signals that can be generated using the calibration target (i.e., may allow for an enhanced distribution of intensities across the full dynamic range of the detector being calibrated).

Figure 7A:
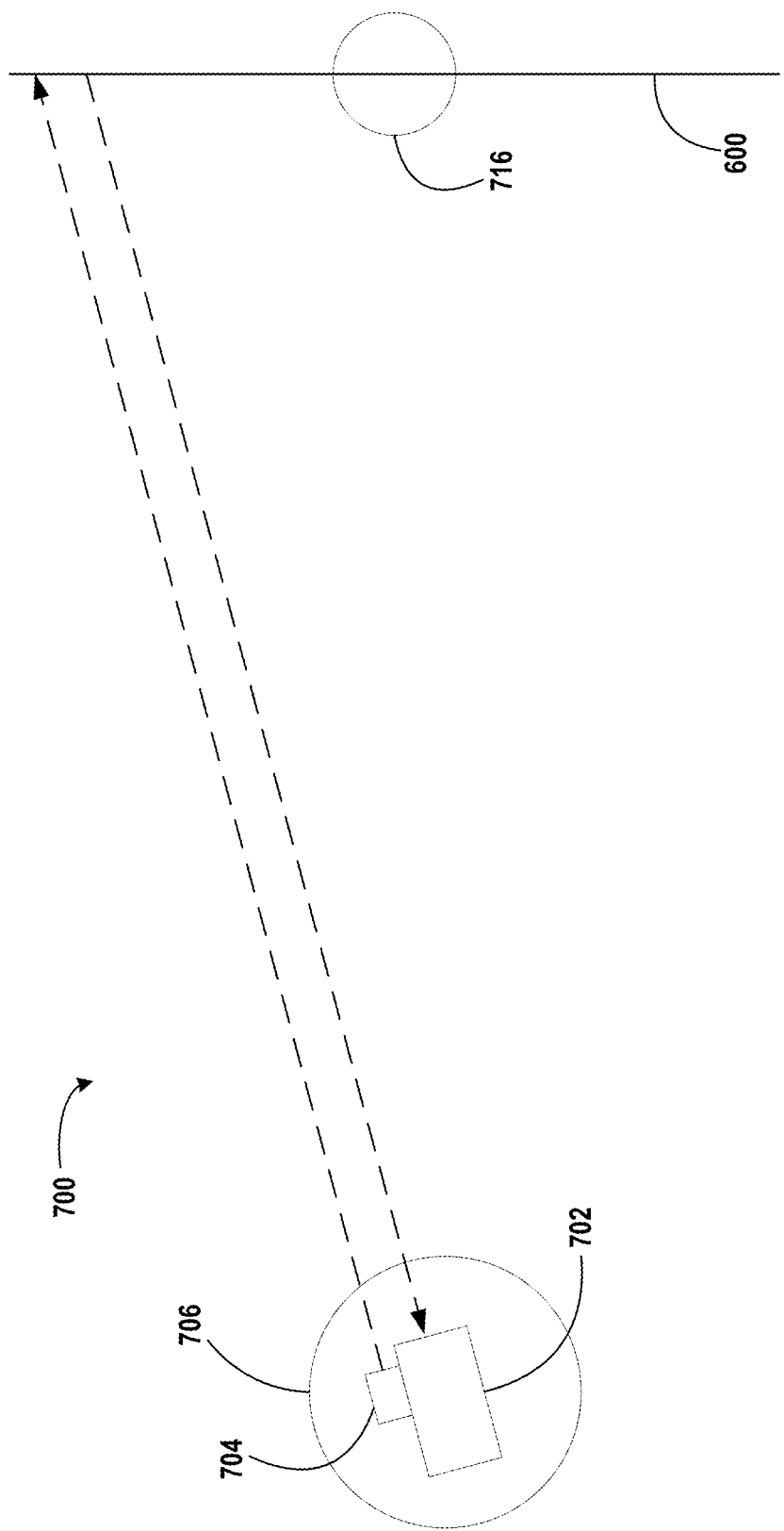
FIG. 7A is an illustration of a calibration system, according to example embodiments.

FIG. 7A is an illustration of a calibration system 700, according to example embodiments. The calibration system 700 may include a calibration target (e.g., the calibration target 600 illustrated in FIG. 6) and a LIDAR device that includes both a first detector 702 and a first transmitter 704. The calibration system 700 may also include a LIDAR stage 706 and a target stage 716. As described above, the LIDAR device may be separated from the calibration target 600 by a predetermined distance (e.g., 5 meters, 10 meters, 15 meters, 20 meters, 25 meters, etc.). Additionally, the first detector 702 may include one or more photodetectors (e.g., SiPMs, APDs, SPADs, etc.) and the first transmitter 704 may include one or more laser sources.

The calibration system 700 may be used to calibrate the first detector 702 (e.g., to generate a set of calibration data, such as a calibration curve, to account for walk error in the first detector 702). One step in the calibration of the first detector 702 may include emitting a light signal from the first transmitter 704 toward a first region (e.g., the second reflective region 604) of the calibration target 600. After the light signal is reflected from the calibration target 600 at a corresponding intensity based on the reflectivity of the respective region of the calibration target 600, the reflected light signal may be detected by the first detector 702. An apparent distance between the LIDAR device (e.g., the first detector 702 and the first transmitter 704) and the calibration target 600 may then be determined based on the detected reflected signal (e.g., using a threshold crossing of a time derivative of the detected reflected signal, similar to the time derivative signals illustrated in FIG. 5B). The actual distance between the calibration target 600 and the LIDAR device (e.g., the first detector 702 and the first transmitter 704), the waveform of the detected reflected signal, the maximum intensity of the detected reflected signal, the time derivative of the detected reflected signal, and/or an apparent distance between the LIDAR device and the calibration target 600 may be stored (e.g., in a non-transitory, computer-readable medium) for use in run-time (e.g., as a point in a set of calibration data, such as a calibration curve and/or a look-up table). For example, a pair of values may be stored in a look-up table for use during run-time. The first value may be the maximum intensity of the detected reflected signal and the second value may be the difference between the actual distance between the LIDAR device and the calibration target 600 and the apparent distance between the LIDAR device and the calibration target 600 (as determined by a threshold crossing in the time derivative of detected reflected signal). Hence, in run-time (i.e., when the LIDAR device is being used to detect unknown ranges to objects in an environment), the determined range to an object can be corrected by accounting for the error in the determined distance based on a threshold crossing of a corresponding time derivative signal and the maximum intensity of a detected reflected signal.

Figure 7B:
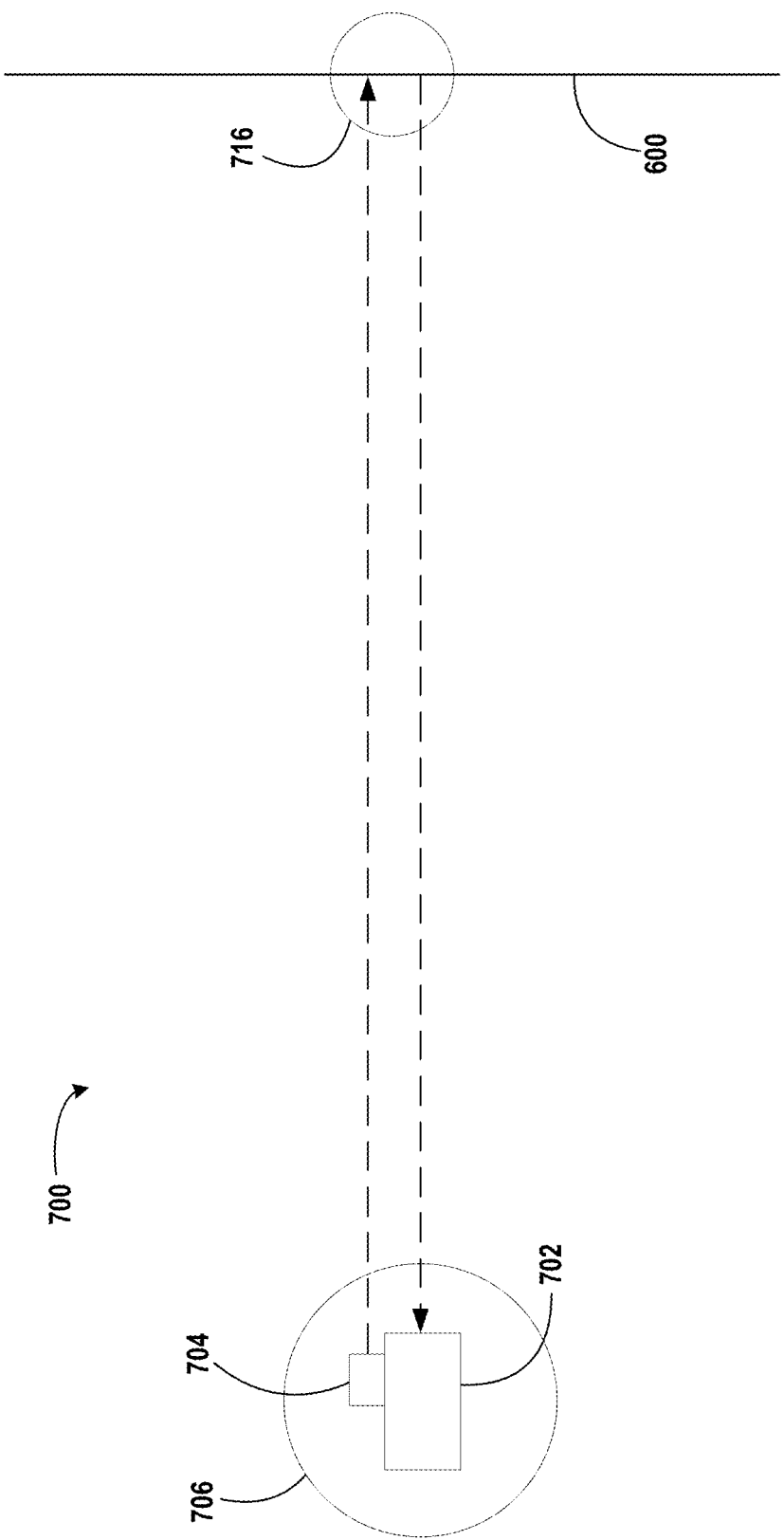
FIG. 7B is an illustration of a calibration system, according to example embodiments.

FIG. 7B illustrates a second calibration measurement made using the calibration system 700. Similar to the measurement illustrated in FIG. 7A, the measurement illustrated in FIG. 7B includes the emission of a light signal from the first transmitter 704 of the LIDAR device that is reflected from the calibration target 600 and detected by the first detector 702 of the LIDAR device. In FIG. 7B, however, the light signal may be emitted toward a different reflective region of the calibration target 600 than in FIG. 7A. For example, the light signal may be emitted toward the first reflective region 602 of the calibration target 600 illustrated in FIG. 6. In this way, a different reflectivity of the calibration target 600 can be used, thereby allowing for a calibration of a different signal intensity.

Similar with the calibration measurement illustrated in FIG. 7A, the actual distance between the calibration target 600 and the LIDAR device (e.g., the first detector 702 and the first transmitter 704), the waveform of the detected reflected signal, the maximum intensity of the detected reflected signal, the time derivative of the detected reflected signal, and/or an apparent distance between the LIDAR device and the calibration target 600 may be stored (e.g., in a non-transitory, computer-readable medium) for use in run-time (e.g., as a point in a set of calibration data, such as a calibration curve and/or a look-up table).

Figure 7C:
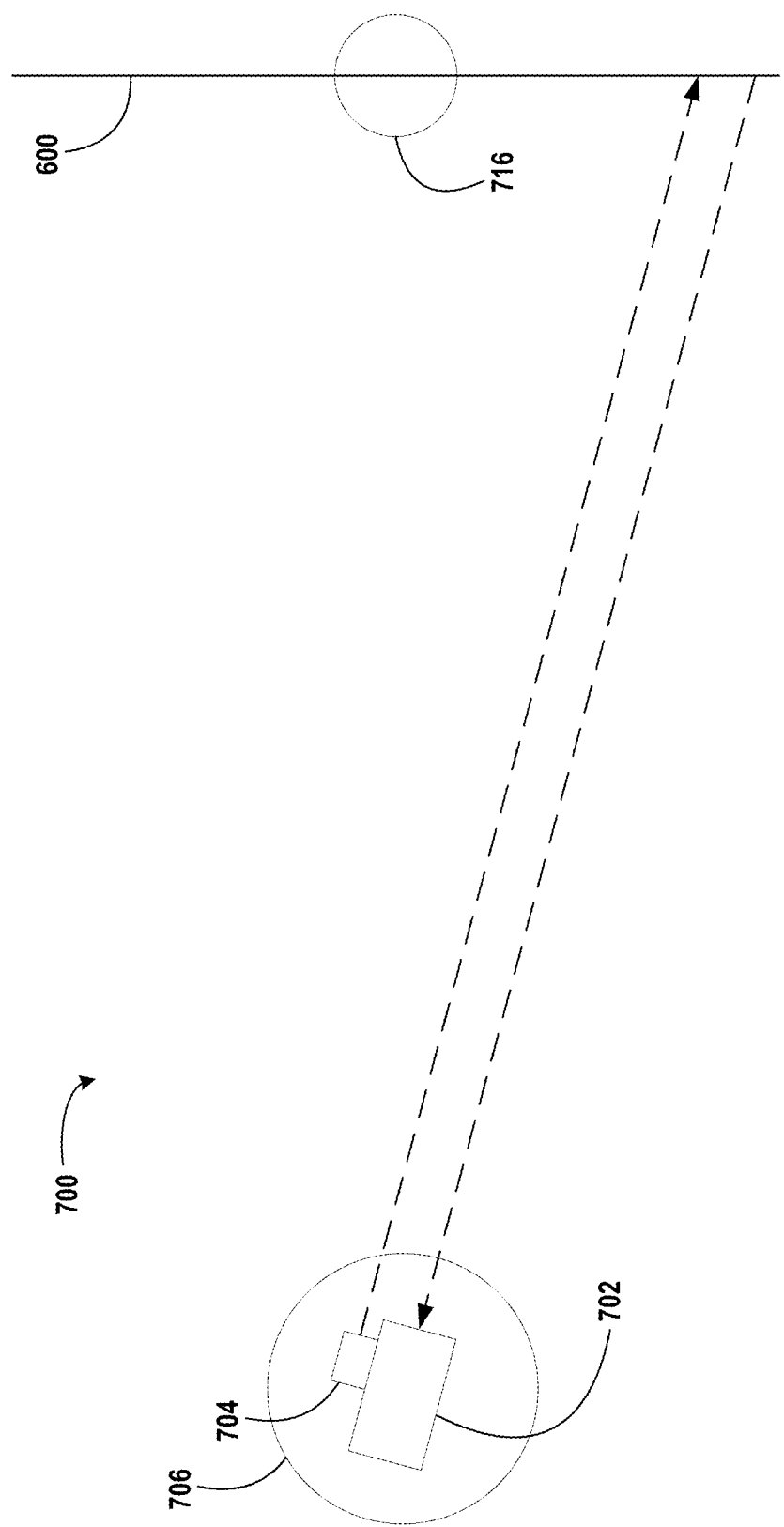
FIG. 7C is an illustration of a calibration system, according to example embodiments.

A third calibration measurement that includes emitting the signal toward yet another reflective region of the calibration target (e.g., the fifth reflective region 610 as illustrated in FIG. 6) is illustrated in FIG. 7C. The data gathered from each of the calibration measurements in FIGS. 7A-7C may be stored in the same look-up table. Additionally or alternatively, the data gathered from the calibration measurements may be stored in a calibration curve (e.g., a calibration curve generated by interpolation and/or regression that relates errors in determined distances to the target to the maximum intensity of the detected reflected signal).

To direct the light signals to different regions of the calibration target 600, the LIDAR device may be rotated between calibration measurements (e.g., between the measurements of FIGS. 7A and 7B). Such a rotation may be performed by the LIDAR stage 706, as illustrated in FIGS. 7A-7C. The LIDAR stage 706 may include a motorized tip/tilt stage configured to rotate the LIDAR device in yaw, pitch, or roll directions. Additionally, the LIDAR stage 706 may be configured to linearly translate the LIDAR device relative to the calibration target 600 (e.g., in in x, y, and z directions). Such a linear translation may allow for characterization of different calibration distances between the LIDAR device and the calibration target 600, for example. Further, the LIDAR stage 706 may be controlled by a computer device (e.g., a motor controller).

Additionally or alternatively, the target stage 716 may be configured to rotate the calibration target 600 in yaw, pitch or roll directions (e.g., via a motorized tip/tilt stage) and/or linearly translate the calibration target 600 relative to the LIDAR device (e.g., in x, y, and z directions). The target stage 716 may likewise be controlled by a computing device (e.g., a motor controller). In some embodiments, rather than (or in addition to) translating and/or rotating the LIDAR device relative to the calibration target 600 to characterize different perspectives, the calibration target 600 may be translated and/or rotated relative to the LIDAR device (e.g., using the target stage 716).

Based on the rotation of the LIDAR device in between calibration measurements, the distance between the LIDAR device and the calibration target 600 may be different for different reflective regions of the calibration target 600. In some embodiments, this may be accounted for in the stored actual distance (e.g., by trigonometrically calculating the difference in actual distance based on difference in orientation angle of the first transmitter 704 toward a flat calibration target 600). In alternative embodiments, a curved calibration target (e.g., spherically curved or cylindrically curved) with an appropriate radius of curvature may be used such that even with a rotation of the LIDAR device, the distance between the LIDAR device and each of the respective reflective regions of the calibration target is the same.

Calibration measurements may be performed in addition to those illustrated in FIGS. 7A-7C to generate calibration data for the first detector 702 of the LIDAR device. For example, additional signals may be emitted by the first transmitter 704 toward additional reflective regions of the calibration target 600 (e.g., to characterize additional detected reflected signals having different intensity waveforms). Additionally or alternatively, the calibration target 600 may be moved relative to the LIDAR device such that additional data points taken of different distances between the LIDAR device and the calibration target 600 can be captured. Such additional data points may be captured by reflecting light signals from the same reflective regions of the calibration target 600 as before the calibration target 600 was moved relative to the LIDAR device and/or different reflective regions of the calibration target 600.

Figure 8B:
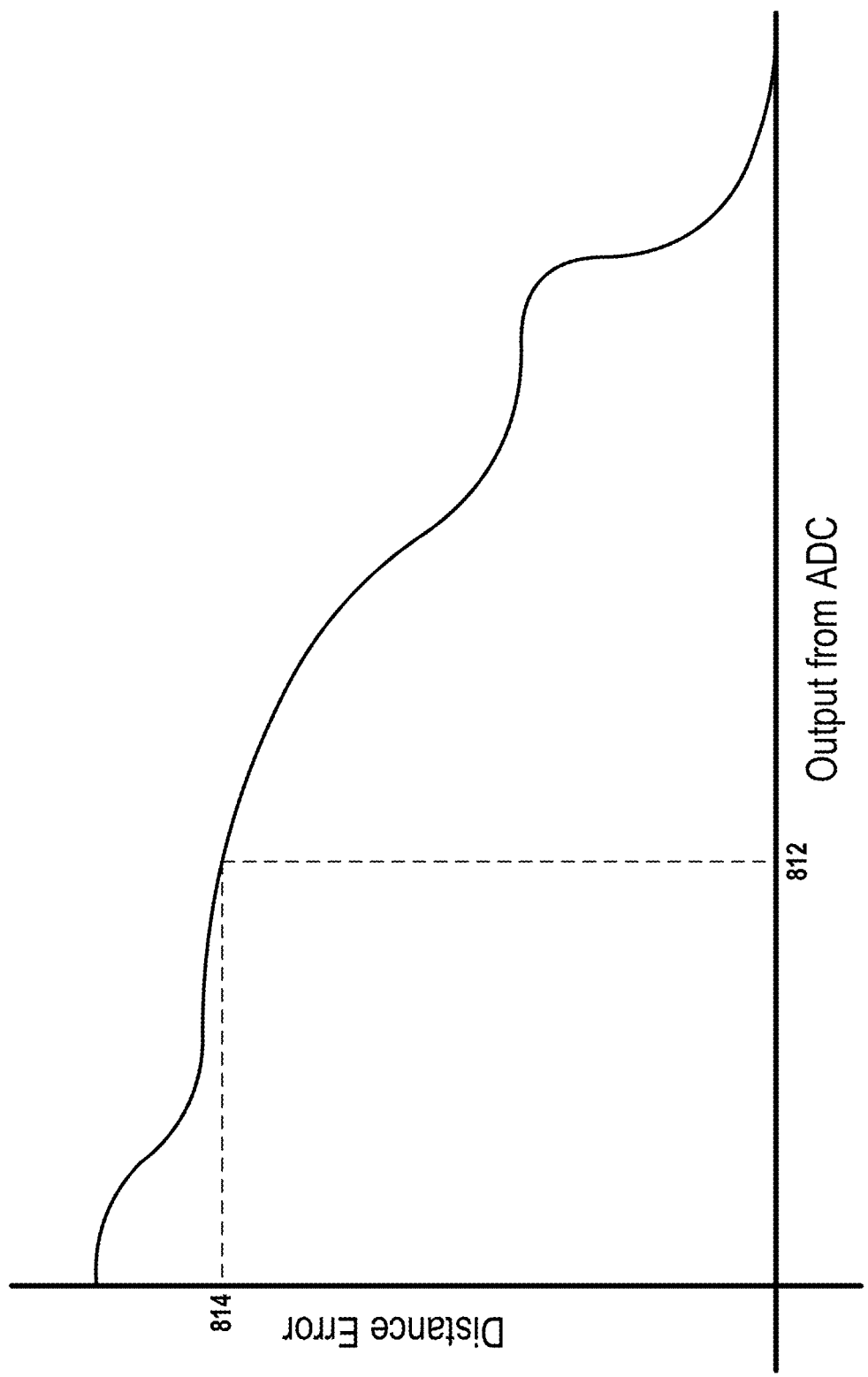
FIG. 8B is an illustration of distance error with respect to peak output from a detector, according to example embodiments.
Figure 8C:
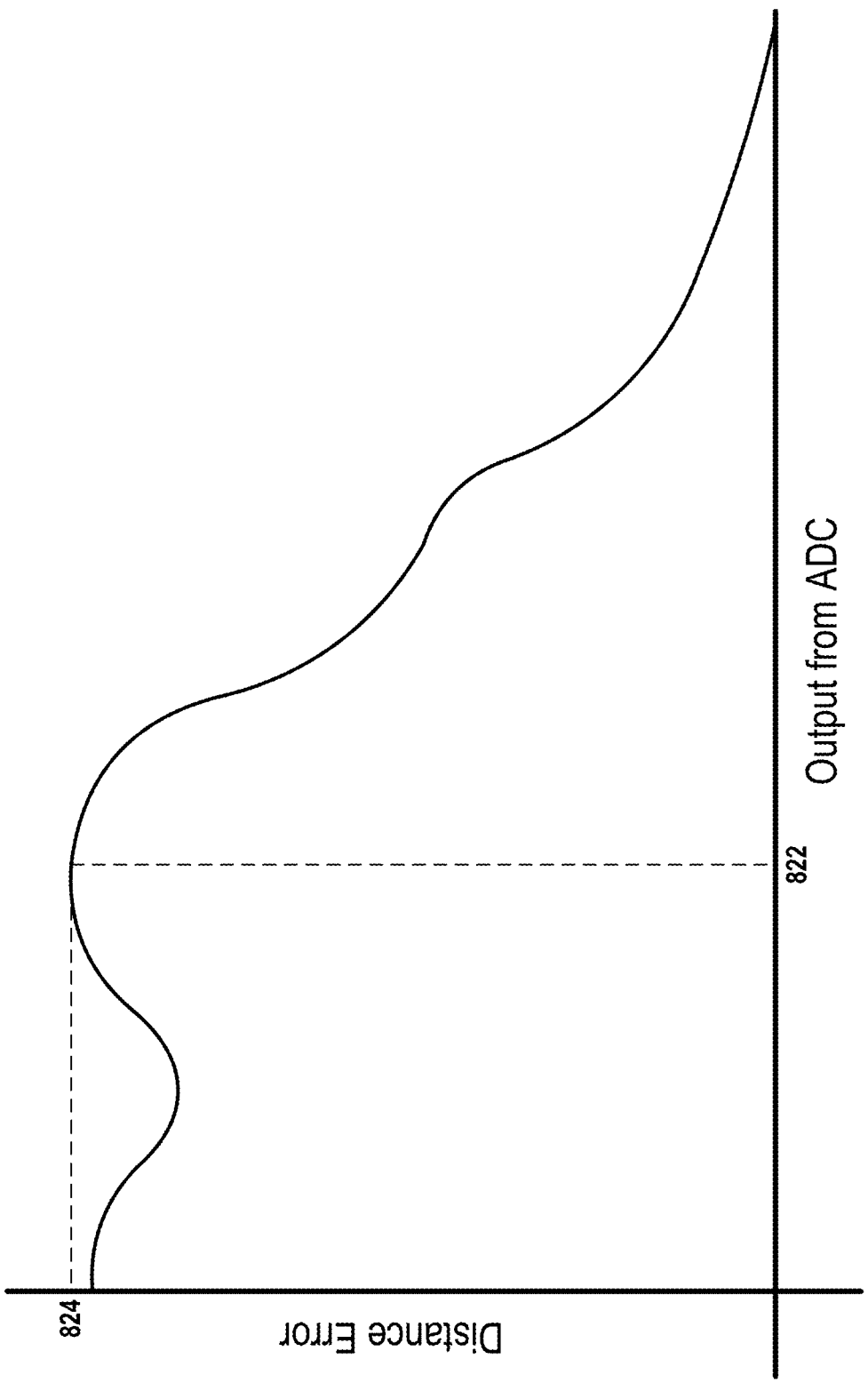
FIG. 8C is an illustration of distance error with respect to peak output from a detector, according to example embodiments.

Some example calibration curves generated based on a series of signals transmitted by the transmitter are illustrated in FIGS. 8A-8C. The calibration curves may relate distance error (e.g., error in an apparent distances to the calibration target determined based on threshold crossings within time derivative signals when compared with the actual distances to the calibration target) to the maximum intensity of a detected reflected signal (e.g., as output from an ADC in the pulse detection device 400). Further, the calibration curves may correspond to one or more look-up tables stored for use during run-time that correlate the same variables.

The calibration curves illustrated in FIGS. 8A-8C may each correspond to a different pair of transmitters/detectors (e.g., different pairs in a single LIDAR device or different pairs in different LIDAR devices). In some embodiments, as described below with respect to FIGS. 9A-9D, some LIDAR devices may include multiple pairs of transmitters/detectors. Because the operation of each pair of transmitters/detectors (e.g., based on semiconductor device physics of the detector) is likely to be at least slightly different, a separate calibration curve for each pair of transmitters/detectors within a LIDAR device may be generated. For example, the calibration curve in FIG. 8A may correspond to the calibration of a first transmitter/first detector of a LIDAR device, the calibration curve in FIG. 8B may correspond to the calibration of a second transmitter/second detector of the LIDAR device, and the calibration curve in FIG. 8C may correspond to the calibration of a third transmitter/third detector of the LIDAR device. Further, the field of view of a LIDAR device including multiple transmitter/detector pairs may span a wider area than is occupied by the calibration target 600. Hence, in order to obtain a full set of calibration curves for the entire field of view of such a LIDAR device, the LIDAR device may be translated and/or rotated (e.g., by the LIDAR stage 706) in between transmission/detection events by each of the transmitter/detector pairs.

After the calibration curves have been generated, the calibration curves may be used in run-time to compensate for any inherent walk error present within a given detector. For example, as illustrated in FIG. 8A, when a first output 802 is detected from the ADC of the LIDAR device, a first distance error 804 may be determined based on the calibration curve. The first output 802 may correspond to an intensity of a detected reflected signal at a threshold crossing of a corresponding time derivative signal (e.g., as shown and described with reference to FIGS. 5A and 5B). The first distance error 804 may be added to or subtracted from an apparent range that is determined with the inherent walk error of the LIDAR device present. Similarly, as illustrated in FIGS. 8B and 8C, respectively, a second distance error 814 and a third distance error 824 may correspond to a second output 812 and a third output 822 from the ADCs of different light detectors, respectively. Further, as illustrated, even though the first output 802, the second output 812, and the third output 822 may each have the same numerical value, the corresponding first distance error 804, second distance error 814, and third distance error 824 may be numerically different from one another due to intrinsic differences among the first, second, and third transmitter/detector pairs.

In some cases (e.g., after performing generated the calibration data illustrated in FIGS. 8A-8C) a light detector may drift away from the behavior characterized during calibration. As such, the calibration data may increase or decrease for various waveforms as time goes one. For example, the ambient temperature may affect the semiconductor device physics of the detector, thereby resulting in different walk errors than characterized during calibration. Other causes of drift within a pulse detection device are also possible (e.g., the threshold values set by the comparator may not remain constant over time).

One technique to account for the change in detector behavior over time would be to re-run the calibration using a calibration system (e.g., the same calibration system used to originally calibrate the transmitter/detector pair, such as the calibration system 700 illustrated in FIGS. 7A-7C) to obtain new calibration data. Such a technique may be impractical in some applications, however. For example, if the LIDAR device is attached to a different system after initial calibration (e.g., to an autonomous vehicle for object detection), removing the LIDAR device from the system may be time-consuming, expensive, and/or infeasible. Further, the autonomous vehicle may be of such a size that the combination of the autonomous vehicle with the attached LIDAR device cannot be used with the calibration system (e.g., the calibration target would not be in the field of view of the detector if the detector were placed in the calibration system or the full field of view of the detector could not be calibrated using the calibration system once the LIDAR device were mounted to the autonomous vehicle). Hence, it may be difficult or undesirable to again perform an entire calibration of the detector of the LIDAR device using the calibration system. As such, other methods of performing a recalibration are described herein.

Confirmation calibrations may be performed in run-time (e.g., when the LIDAR device is using transmitted light signals to scan a surrounding environment to perform object detection). For example, confirmation calibrations could be performed when an autonomous vehicle employing the LIDAR device is navigating a road. Additionally or alternatively, the confirmation calibration could occur whenever an autonomous vehicle employing the LIDAR device is recharging one or more batteries, refilling fuel, and/or parked in a storage garage.

Further, such confirmation calibrations may be performed using one or more on-board computing devices (e.g., one or more on-board controllers of the LIDAR device and/or of a system employing the LIDAR device, such as the computer system 112 illustrated in FIG. 1). Alternatively, confirmation calibrations may be performed by a remote computing device, such as the server computing system 306 or the remote computing system 302 illustrated in FIG. 3. In still other embodiments, data from measurements could be stored remotely (e.g., on a non-transitory, computer-readable medium, such as a cloud server) and the confirmation calibration could be performed at a later time (e.g., by one or more on-board computing devices and/or one or more remote computing devices). Performing the confirmation calibration at a later time may free up computing resources for other tasks (e.g., performing object detection and avoidance tasks in an autonomous vehicle).

Some confirmation calibrations contemplated herein may compare the determined range to the same object in a scene across a number of transmitter/detector pairs that were previously calibrated (e.g., using the calibration techniques described above). For example, each transmitter/detector pair in a LIDAR device may determine the distance to an object in a surrounding scene. The respective distances may be based on the threshold crossings in time derivatives of detected reflected signals. Further, the respective distances may attempt to account for any walk error in the determined distances based on the calibration data (e.g., calibration curve) previously determined for the respective transmitter/detector pair. Thereafter, a regression process may be performed to determine the most-probable location of the object in space (e.g., by picking a localization in space that minimizes the aggregate error by which each of the respective distances is off from the actual distance). Then, based on the determined most-probable location of the object, the calibration data for each of the transmitter/detector pairs may be updated (e.g., a point in a look-up table may be updated based on the distance between the LIDAR device and the most-probable location of the object). Additionally, in some embodiments, any differences in distance to the object or differences in reflectivity of the object when viewed from different angles may also be taken into account when performing a confirmation calibration. Further, the greater the number of transmitter/detector pairs in the LIDAR device, the more accurate the results that such a regression process may produce.

Figure 9A:
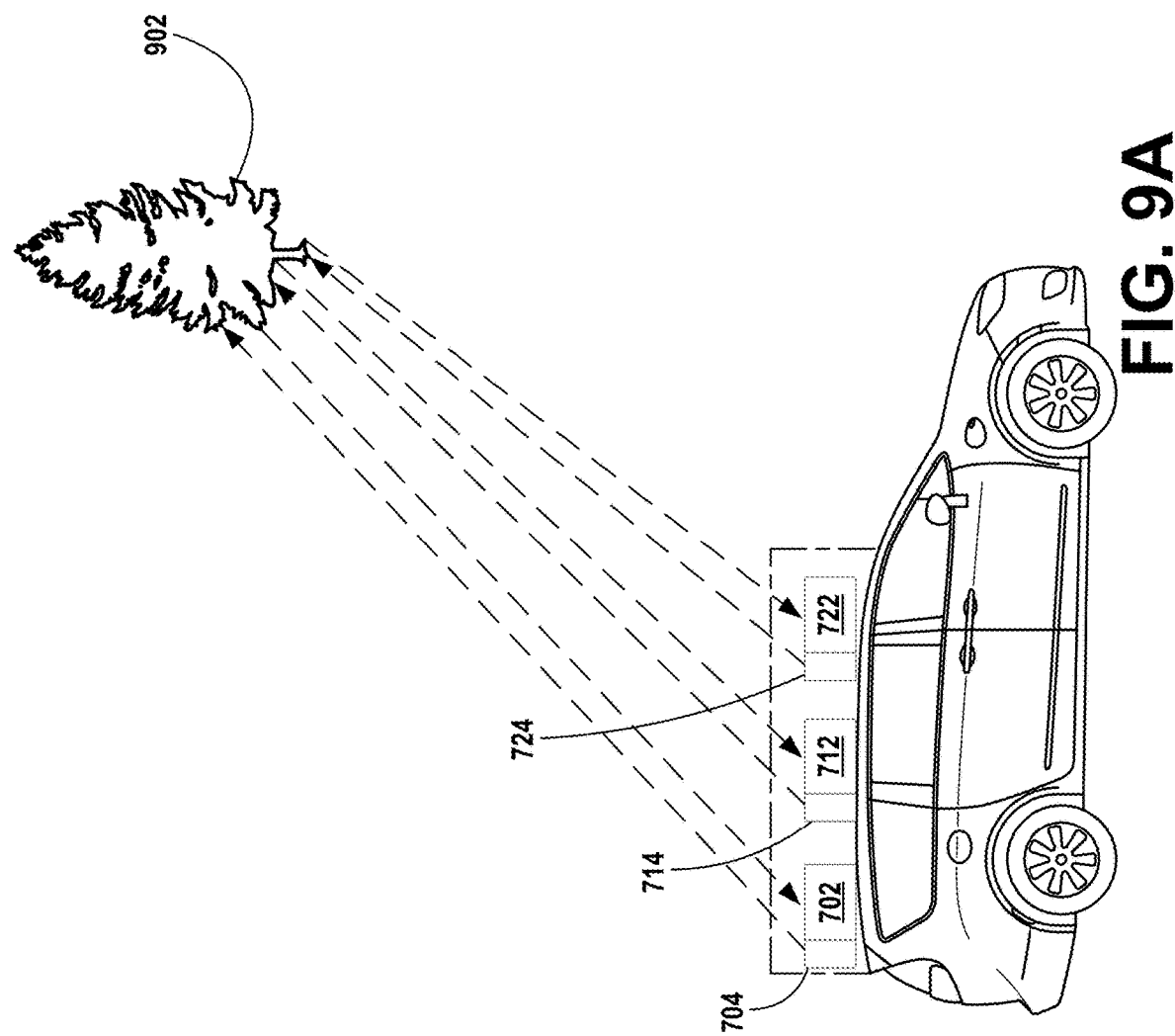
FIG. 9A is an illustration of a run-time confirmation calibration, according to example embodiments.

FIG. 9A is an illustration of a run-time confirmation calibration, according to example embodiments. The run-time confirmation calibration may be performed by a LIDAR device (e.g., a LIDAR device used on an autonomous vehicle, such as the LIDAR 128 illustrated in FIG. 1) that includes a series of pairs of transmitters and detectors. For example, the LIDAR device may include the first detector 702, the first transmitter 704, a second detector 712, a second transmitter 714, a third detector 722, and a third transmitter 724. The run-time confirmation calibration may be performed by the LIDAR device transmitting signals and receiving reflections of those signals from an object 902 in an environment surrounding the LIDAR device. It is understood that the figures, including FIG. 9A, are included for illustrative purposes. For example, the positions/orientations of the transmitters and detectors in FIG. 9A relative to the autonomous vehicle do not necessarily reflect precise positions/orientations of the transmitter/detectors.

As described above, each of the transmitter/detector pairs may determine a compensated distance between the transmitter/detector pair and the object 902. These compensated distances may be determined by: first, the transmitter of the transmitter/detector pair emitting a light signal toward the object 902 and the detector of the transmitter/detector pair detecting a reflected light signal from the object 902; then, based on the detected reflected signal, a transit time (e.g., based on a threshold crossing in a corresponding time derivative signal) may be determined (e.g., by a computing device associated with the transmitter/detector pair and/or associated with the entire LIDAR device), which could be used to determine a raw distance (e.g., based on the speed of light); and lastly, the compensated distance may be determined by using the previously acquired calibration data and the detected reflected signal (e.g., the maximum intensity of the waveform of the detected reflected signal) to determine a walk error correction value and then adding walk error correction value to the apparent distance to determine a compensated distance.

Once a compensated distance for each of the transmitter/detector pairs is determined, the compensated distances may be compared to one another. Further, when comparing the compensated distances, calibration data (e.g., a calibration curve) for one or more of the transmitter/detector pairs may be updated. Updating calibration data may include plotting the compensated distances relative to one another and performing a regression analysis.

Figure 9B:
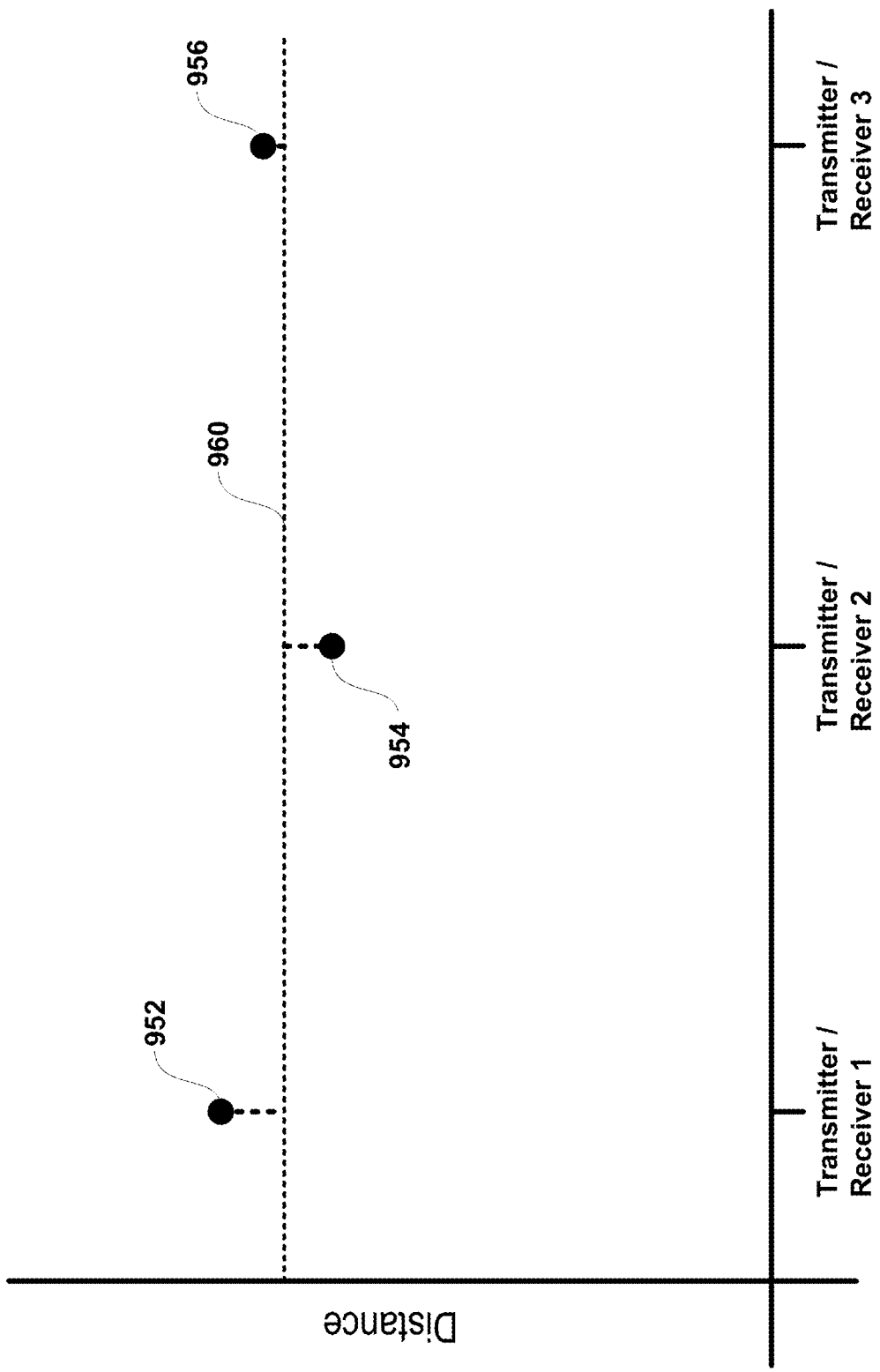
FIG. 9B is an illustration of a regression analysis, according to example embodiments.

FIG. 9B is an illustration of a regression analysis, according to example embodiments. The vertical axis in FIG. 9B corresponds to distance and the horizontal axis plots the various transmitter/detector pairs in the LIDAR device. In FIG. 9B, a first compensated distance 952, a second compensated distance 954, and a third compensated distance 956 are illustrated. The first compensated distance 952 may be the compensated distance between the first transmitter 704/first detector 702 and the object 902 (e.g., based on raw distance determined based on time of flight of a light signal and based on previously determined calibration data), as illustrated in FIG. 9A. Likewise, the second compensated distance 954 may be the compensated distance between the second transmitter 714/second detector 712 and the object 902 (e.g., based on raw distance determined based on time of flight of a light signal and based on previously determined calibration data), as illustrated in FIG. 9A. In addition, the third compensated distance 956 may be the compensated distance between the third transmitter 724/detector 722 and the object 902 (e.g., based on raw distance determined based on time of flight of a light signal and based on previously determined calibration data), as illustrated in FIG. 9A.

Assuming that the true distances between each transmitter/detector pair and the object 902 are the same as one another, if each of the transmitter/detector pairs were perfectly calibrated, the compensated distances 952, 954, 956 should each be equal to one another and equal to the true distance to the object 902. In cases where the true distances between each transmitter/detector pair and the object 902 are not the same, the differences in true distances can be accounted for, as described below with reference to FIGS. 9C and 9D.

Upon plotting each of the compensated distances 952, 954, 956, a regression technique may be employed to attempt to determine the true location of the object 902 within the scene. For example, a linear regression (e.g., a linear least-squares regression) technique may be performed to determine a regression line 960 that defines a true location of the object 902 by minimizing the error between each of the compensated distances 952, 954, 956 and the regression line 960. Again assuming that the true distance between each transmitter/detector pair and the object 902 is the same, the regression line 960 will be horizontal. Other types of regression are also possible (e.g., polynomial regression or weighted least-squares regression). The regression line 960 determined based on the regression analysis may be used to modify the calibration data for one or more of the transmitter/detector pairs based on a comparison between the respective compensated distance and the corresponding point on the regression line 960 (such a comparison is illustrated by the dashed errors in FIG. 9B).

The actual distance value of the regression line 960 may not exactly represent ground truth, but it is more likely to be an accurate reflection of the true location of the object 902 than any single one of the compensated distances 952, 954, 956 would be. In addition, the greater the number of transmitter/detector pairs, the more reliable the regression line 960 may become. For example, in embodiments where the LIDAR device includes more than three transmitter/detector pairs (e.g., five, ten, fifteen, twenty, twenty-five, thirty, forty, fifty, sixty, seventy, eighty, ninety, or one hundred transmitter/detector pairs), the generated regression line may be closer to ground truth than the regression line 960 illustrated in FIG. 9B.

Figure 9C:
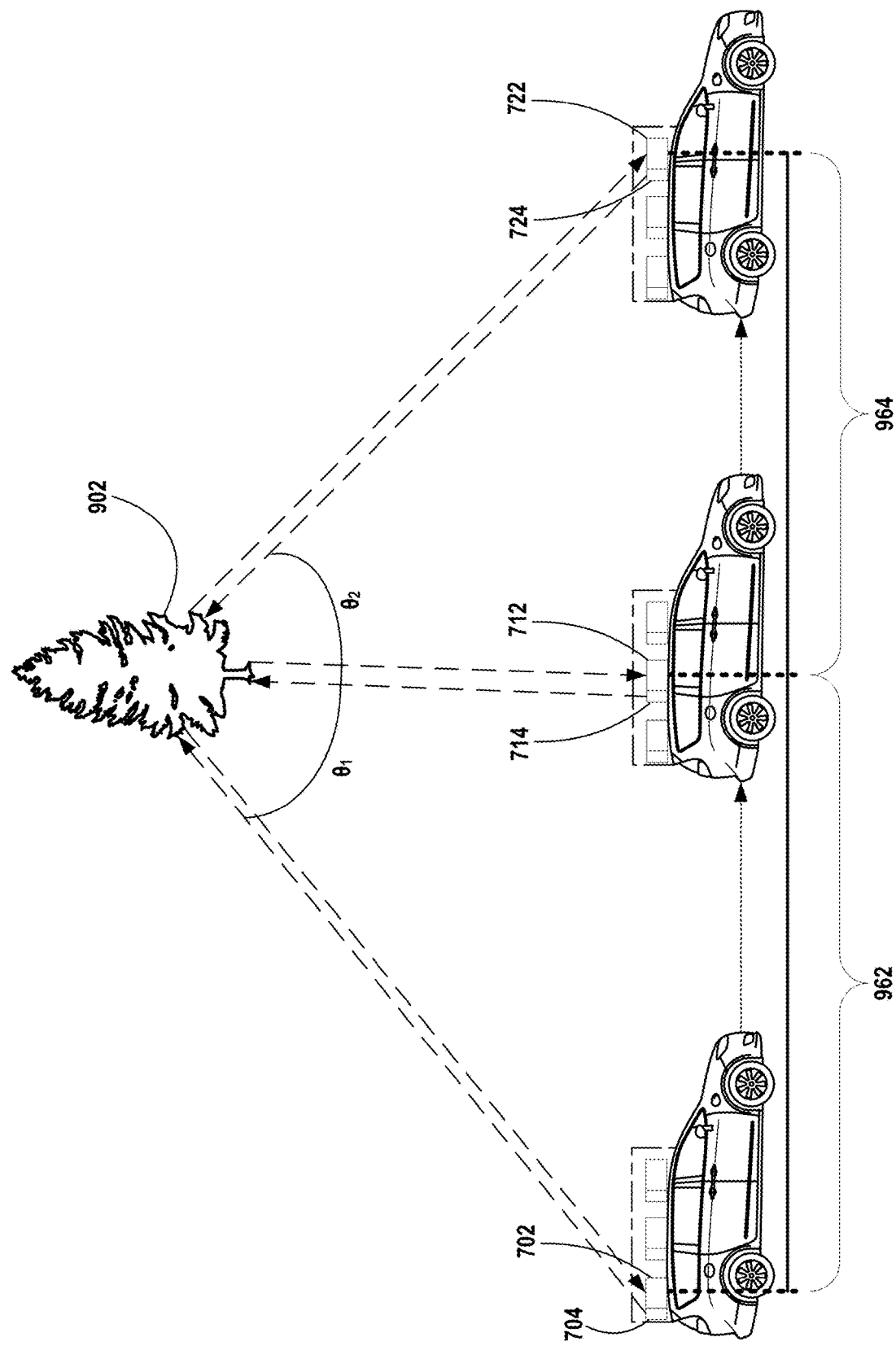
FIG. 9C is an illustration of a run-time confirmation calibration, according to example embodiments.

FIG. 9C is an illustration of a run-time confirmation calibration, according to example embodiments. The run-time confirmation calibration may be performed by a LIDAR device that includes a series of pairs of transmitters and detectors. For example, the LIDAR device may include the first detector 702, the first transmitter 704, the second detector 712, the second transmitter 714, the third detector 722, and the third transmitter 724. The run-time confirmation calibration may be performed by the LIDAR device transmitting signals and receiving reflections of those signals from the object 902 in an environment surrounding the LIDAR device.

As described above, the distance between the respective transmitter/detector pairs and the object 902 in the scene may not be the same. This may be due to the fact that the respective transmitter/detector pairs are located at slightly different positions within the LIDAR device. Additionally or alternatively, the differences in distance may be due to the fact that the detected reflected signals are captured at different points in time and the LIDAR device may have moved relative to the object 902 during that time. Such is the case illustrated in FIG. 9C.

As illustrated, the LIDAR device may be attached to a vehicle (e.g., an autonomous vehicle for which the LIDAR device is used for object detection). The confirmation calibration may be performed as the vehicle is moving through the environment. The first transmitter 704/first detector 702 pair may transmit a light signal and detect a reflected signal from the object 902 at a first position of the vehicle. Thereafter, the second transmitter 714/second detector 712 pair may transmit a light signal and detect a reflected signal from the object 902 at a second position of the vehicle. Still later, the third transmitter 724/third detector 722 pair may transmit a light signal and detect a reflected signal from the object 902 at a third position of the vehicle.

Because the actual distance between the transmitter/detector pairs and the object 902 is not the same for each of the detected reflected signals, in order to properly compare the compensated distances determined based on the detected reflected signals to evaluate any deviation from previously characterized calibrations, a difference in actual distances to the object 902 maybe determined as a baseline. Determining the difference in actual distances to the object 902 may include accounting for how much the LIDAR device has moved between different detected reflected signals and any separation within the LIDAR device of the transmitter/detector pairs. For example, a first difference 962 between the location of the first transmitter 704/first detector 702 when the first detected reflected signal is captured compared to the location of the second transmitter 714/second detector 712 when the second detected reflected signal is captured is illustrated in FIG. 9C. Similarly, a second difference 964 between the location of the second transmitter 714/second detector 712 when the second detected reflected signal is captured compared to the location of the third transmitter 724/third detector 722 when the third detected reflected signal is captured is also illustrated in FIG. 9C. The first difference 962 and the second difference 964 may be determined, for example, based on timestamps of when the detected reflected signals were captured as well as velocity data monitored by a control system of the vehicle during the time intervening the time stamps.

The first difference 962 and the second difference 964 can be used along with the detected reflected signals to compare the compensated distances to the object 902 based on each of the detected reflected signals. Further, if the object 902, itself, is stationary during the capturing of the detected reflected signals (or, even if the object 902 is in motion, but the motion of the object 902 can be determined), angles relative to the object 902 in between captures of reflected signals can be determined. Such angles are illustrated in FIG. 9C (labeled $\theta_1$ and $\theta_2$). Such angles may also be accounted for when comparing detected reflected signals captured by different transmitter/detector pairs. For example, the reflectivity and/or shape of the object 902 may not be isotropic (e.g., the object 902 may be significantly elongated in one or more directions, such that, when viewed from one of those directions, the distance to the object 902 is significantly different than when the object 902 is viewed from another direction and/or the object 902 may be highly reflective when viewed from the side and minimally reflective when viewed from the front, which would affect the detected reflected signals).

Figure 9D:
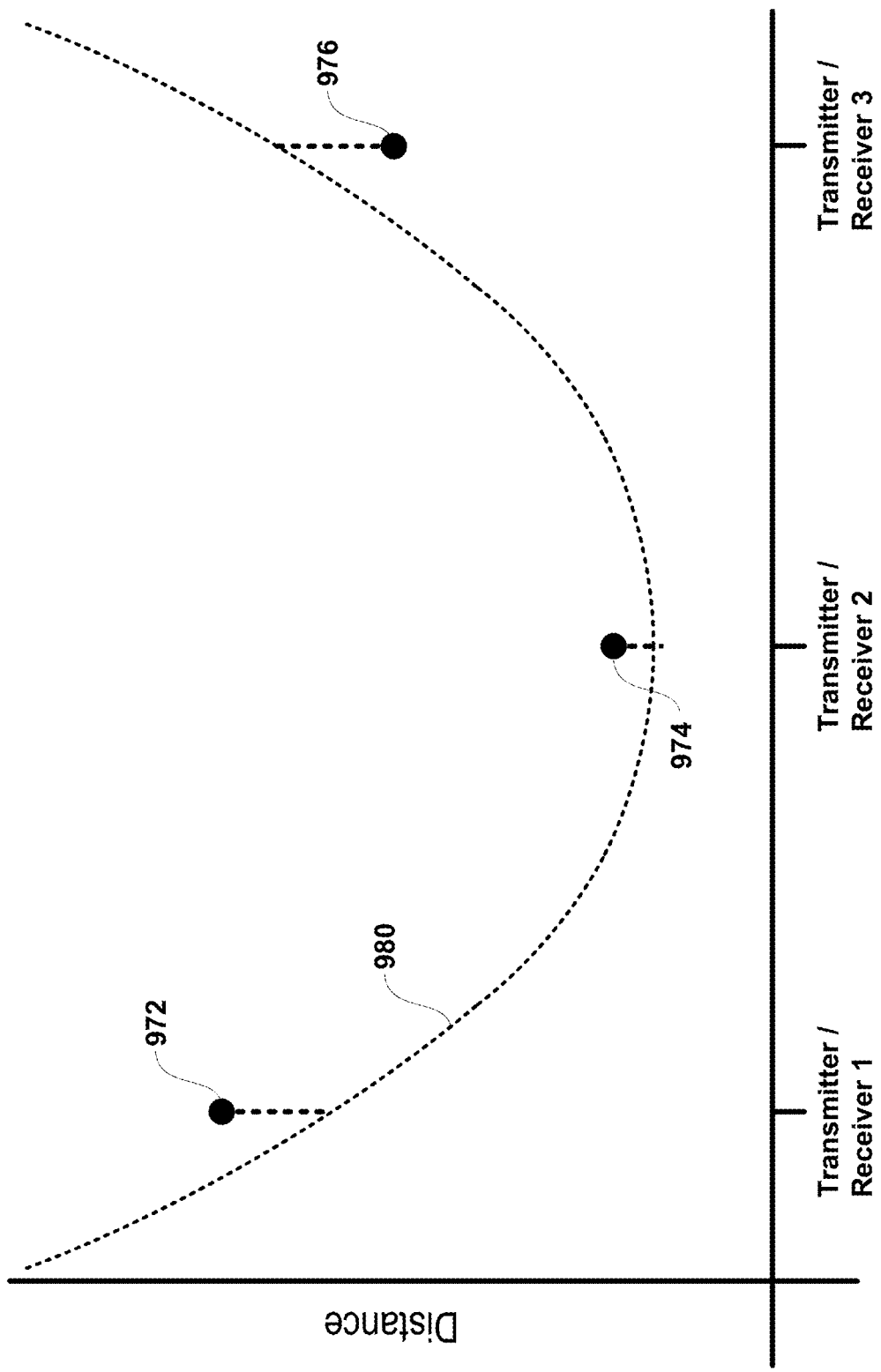
FIG. 9D is an illustration of a regression analysis, according to example embodiments.

FIG. 9D is an illustration of a regression analysis, according to example embodiments. As illustrated, a first compensated distance 972 (e.g., determined based on the detected reflected signal of the first transmitter 704/first detector 702 pair illustrated in FIG. 9C and prior calibration data for the first transmitter 704/first detector 702 pair), a second compensated distance 974 (e.g., determined based on the detected reflected signal of the second transmitter 714/second detector 712 pair illustrated in FIG. 9C and prior calibration data for the second transmitter 714/second detector 712 pair), and a third compensated distance 976 (e.g., determined based on the detected reflected signal of the third transmitter 724/third detector 722 pair illustrated in FIG. 9C and prior calibration data for the third transmitter 724/third detector 722 pair) may be plotted. Because the LIDAR device was in motion when the detected reflected signals were captured, the actual distances between the respective transmitter/detector pairs and the object 902 are different. As such, the compensated distances 972, 974, 976, even if exactly equal to the actual distances to the object 902, would not be equal to one another.

Based on the relative motion of the LIDAR device during the time interval in which the detected reflected signals were captured, the distance may decrease to a minimum (e.g., at which time a signal used to determine a compensated distance to the object 902 would be transmitted exactly perpendicular to the direction of travel of the vehicle) and increase as the LIDAR device moves away from the point that would yield a minimum distance. As such, the regression technique used to perform the confirmation calibration may be something other than a linear least-squares regression (e.g., a polynomial least-squares regression). Such a regression curve 980 is illustrated in FIG. 9D. Similar to the regression line 960 illustrated in FIG. 9B, the regression curve 980 may be used to modify the calibration data for one or more of the transmitter/detector pairs based on a comparison between the respective compensated distance and the corresponding point on the regression curve 980 (such a comparison is illustrated by the dashed errors in FIG. 9D).

The confirmation calibration processes described above with respect to FIGS. 9A-9D may include an assumption that the object 902 is not moving in between the detections of the various reflected light signals by the various detectors of the LIDAR device. If, instead, the object 902 is moving, additional steps may be performed to determine the motion of the object 902 and incorporate that motion into the confirmation calibration. For example, a radar or lidar speed determination device, such as a radar speed gun, may be used to determine a velocity of the object 902, and the velocity of the object 902 may be combined with the time between detected reflected signals to determine the distance the object 902 moved relative to the LIDAR device. The distance the object 902 moved relative to the LIDAR device may be factored into the regression analysis, in some embodiments.

III. Example Processes

Figure 10:
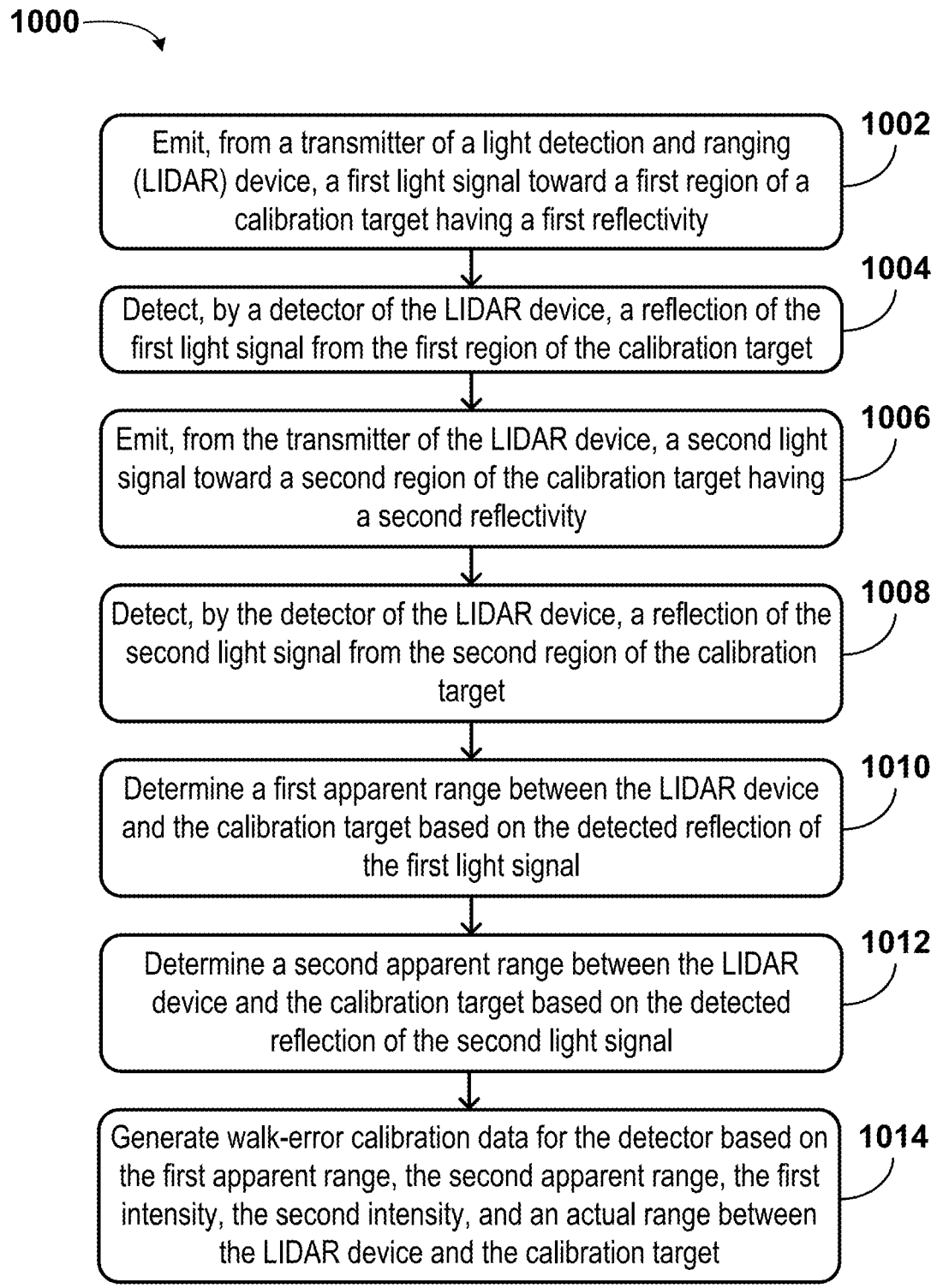
FIG. 10 is an illustration of a method, according to example embodiments.

FIG. 10 is a flowchart diagram of a method 1000, according to example embodiments. In some embodiments, one or more of the blocks of FIG. 10 may be performed by a computing device (e.g., the computer system 112 illustrated in FIG. 1). The computing device may include computing components such as a non-volatile memory (e.g., a hard drive or a read-only memory (ROM)), a volatile memory (e.g., a random-access memory (RAM), such as dynamic random-access memory (DRAM) or static random-access memory (SRAM)), a user-input device (e.g., a mouse or a keyboard), a display (e.g., a light-emitting diode (LED) display or a liquid-crystal display (LCD)), and/or a network communication controller (e.g., a WIFI® controller, based on IEEE 802.11 standards, or an Ethernet controller). The computing device, for example, may execute instructions stored on a non-transitory, computer-readable medium (e.g., a hard drive) to perform one or more of the operations contemplated herein.

At block 1002, the method 1000 may include emitting, from a transmitter of a light detection and ranging (LIDAR) device, a first light signal toward a first region of a calibration target having a first reflectivity.

At block 1004, the method 1000 may include detecting, by a detector of the LIDAR device, a reflection of the first light signal from the first region of the calibration target. The detected reflection of the first light signal has a first intensity.

At block 1006, the method 1000 may include emitting, from the transmitter of the LIDAR device, a second light signal toward a second region of the calibration target having a second reflectivity.

At block 1008, the method 1000 may include detecting, by the detector of the LIDAR device, a reflection of the second light signal from the second region of the calibration target. The detected reflection of the second light signal has a second intensity. The second intensity is different than the first intensity.

At block 1010, the method 1000 may include determining a first apparent range between the LIDAR device and the calibration target based on the detected reflection of the first light signal.

At block 1012, the method 1000 may include determining a second apparent range between the LIDAR device and the calibration target based on the detected reflection of the second light signal. The second apparent range is different than the first apparent range.

At block 1014, the method 1000 may include generating walk-error calibration data for the detector based on the first apparent range, the second apparent range, the first intensity, the second intensity, and an actual range between the LIDAR device and the calibration target.

In some embodiments of the method 1000, the first reflectivity may be greater than the second reflectivity. Further, the first region of the calibration target may include a retroreflective material. In addition, the second region of the calibration target may include an optically transparent material. An "optically transparent" material being a material that is at least 95% non-reflective of light having a visible wavelength.

In some embodiments, the method 1000 may include emitting, from the transmitter of the LIDAR device, a third light signal toward an edge of the calibration target. The method 1000 may also include detecting, by the detector of the LIDAR device, a partial reflection of the third light signal from the edge of the calibration target. The detected partial reflection of the third light signal has a third intensity. The third intensity may be different than the first intensity and the second intensity. The method 1000 may further include determining a third apparent range between the LIDAR device and the calibration target based on the detected partial reflection of the third light signal. The third apparent range may be different than the first apparent range and the second apparent range. Further, generating the walk-error calibration data for the detector is further based on the third apparent range and the third intensity.

In some embodiments of the method 1000, the first intensity and the second intensity may be determined based on an output of an analog-to-digital converter (ADC).

In some embodiments of the method 1000, the detected reflection of the first light signal may include a first waveform and determining the first apparent range may include determining a time derivative of the first waveform. Further, the detected reflection of the second light signal may include a second waveform and determining the second apparent range may include determining a time derivative of the second waveform. Additionally, in some embodiments, determining the first apparent range may include determining when the time derivative of the first waveform falls below a threshold value. Determining the second apparent range may also include determining when the time derivative of the second waveform falls below the threshold value.

In some embodiments of the method 1000, the walk-error calibration data may include a look-up table. The method 1000 may also include determining an apparent distance to an object of interest using the LIDAR device. Further, the method 1000 may include determining, based on the apparent distance to the object of interest and the look-up table, an actual distance to the object of interest. In addition, the method 1000 may include adjusting a direction or velocity of a vehicle based on the actual distance to the object of interest.

In some embodiments, the method 1000 may also include tilting, rotating, or translating the LIDAR device such that the second light signal is emitted toward the second region of the calibration target.

In some embodiments, the method 1000 may include emitting, from an additional transmitter of the LIDAR device, a third light signal toward the first region of the calibration target having the first reflectivity. The method 1000 may also include detecting, by an additional detector of the LIDAR device, a reflection of the third light signal from the first region of the calibration target. The detected reflection of the third light signal has a third intensity. Further, the method 1000 may include emitting, from the additional transmitter of the LIDAR device, a fourth light signal toward the second region of the calibration target having the second reflectivity. In addition, the method 1000 may include detecting, by the additional detector of the LIDAR device, a reflection of the fourth light signal from the second region of the calibration target. The detected reflection of the fourth light signal has a fourth intensity. The fourth intensity is different than the third intensity. Still further, the method 1000 may include determining a third apparent range between the LIDAR device and the calibration target based on the detected reflection of the third light signal. Even further, the method 1000 may include determining a fourth apparent range between the LIDAR device and the calibration target based on the detected reflection of the fourth light signal. The fourth apparent range may be different than the third apparent range. Additionally, the method 1000 may include generating walk-error calibration data for the additional detector based on the third apparent range, the fourth apparent range, the third intensity, the fourth intensity, and the actual range between the LIDAR device and the calibration target. In some embodiments, the method 1000 may include emitting, from the transmitter of the LIDAR device, a fifth light signal toward an object in an environment surrounding the LIDAR device. Further, the method 1000 may include detecting, by the detector of the LIDAR device, a reflection of the fifth light signal from the object in the environment surrounding the LIDAR device. The detected reflection of the fifth light signal has a fifth intensity. Even further, the method 1000 may include emitting, from the additional transmitter of the LIDAR device, a sixth light signal toward the object in the environment surrounding the LIDAR device. Yet further, the method 1000 may include detecting, by the additional detector of the LIDAR device, a reflection of the sixth light signal from the object in the environment surrounding the LIDAR device. The detected reflection of the sixth light signal has a sixth intensity. In addition, the method 1000 may include determining a first compensated range between the LIDAR device and the object based on the walk-error calibration data for the detector and the fifth intensity. Still further, the method 1000 may include determining a second compensated range between the LIDAR device and the object based on the walk-error calibration data for the additional detector and the sixth intensity. Even still further, the method 1000 may include comparing the first compensated range and the second compensated range. Yet still further, the method 1000 may include modifying the walk-error calibration data for the detector or the walk-error calibration data for the additional detector based on the comparison between the first compensated range and the second compensated range. In some embodiments of the method 1000, the LIDAR device may be mounted on a vehicle. In some embodiments of the method 1000, comparing the first compensated range and the second compensated range may include accounting for a difference in a position of the detector and a position of the additional detector relative to the object in the environment. In some embodiments of the method 1000, accounting for the difference in the position of the detector and the position of the additional detector relative to the object in the environment may include accounting for differences in distances relative to the object in the environment. In some embodiments of the method 1000, accounting for the difference in the position of the detector and the position of the additional detector relative to the object in the environment may also include accounting for differences in reflectivity of the object in the environment based on angle relative to the object.

Figure 11A:
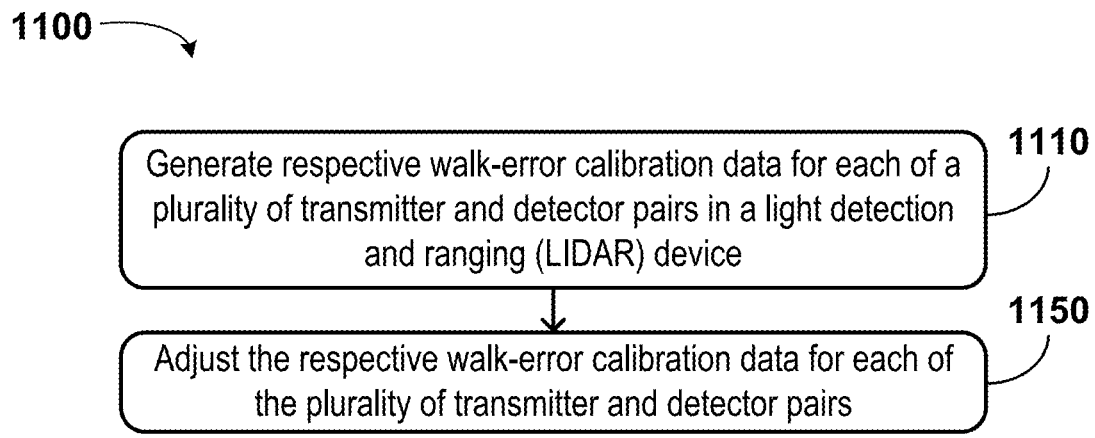
FIG. 11A is an illustration of a method, according to example embodiments.

FIG. 11A is a flowchart diagram of a method 1100, according to example embodiments. In some embodiments, one or more of the blocks of FIG. 11A may be performed by a computing device (e.g., the computer system 112 illustrated in FIG. 1). The computing device may include computing components such as a non-volatile memory (e.g., a hard drive or a ROM), a volatile memory (e.g., a RAM, such as DRAM or SRAM), a user-input device (e.g., a mouse or a keyboard), a display (e.g., an LED display or an LCD), and/or a network communication controller (e.g., a WIFI® controller, based on IEEE 802.11 standards, or an Ethernet controller). The computing device, for example, may execute instructions stored on a non-transitory, computer-readable medium (e.g., a hard drive) to perform one or more of the operations contemplated herein.

At block 1110, the method 1100 may include generating respective walk-error calibration data for each of a plurality of transmitter and detector pairs in a light detection and ranging (LIDAR) device.

At block 1150, the method 1100 may include adjusting the respective walk-error calibration data for each of the plurality of transmitter and detector pairs.

Figure 11B:
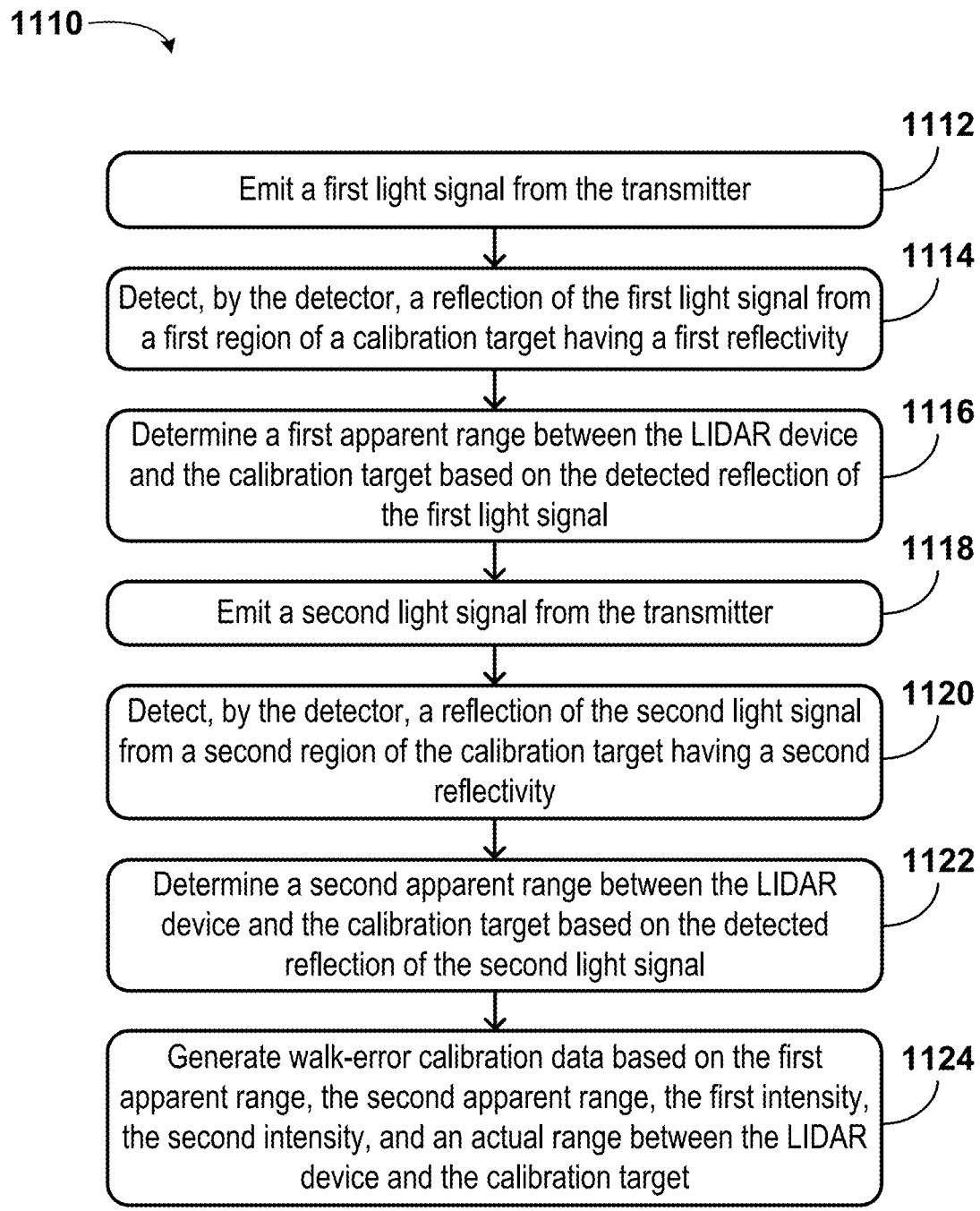
FIG. 11B is an illustration of sub-elements of a method, according to example embodiments.

FIG. 11B is a flowchart diagram of the sub-elements of block 1110 (e.g., blocks that are performed to generate respective walk-error calibration data for each of a plurality of transmitter and detector pairs in a light detection and ranging (LIDAR) device).

At sub-element 1112, block 1110 may include emitting a first light signal from the transmitter.

At sub-element 1114, block 1110 may include detecting, by the detector, a reflection of the first light signal from a first region of a calibration target having a first reflectivity. The detected reflection of the first light signal has a first intensity.

At sub-element 1116, block 1110 may include determining a first apparent range between the LIDAR device and the calibration target based on the detected reflection of the first light signal.

At sub-element 1118, block 1110 may include emitting a second light signal from the transmitter.

At sub-element 1120, block 1110 may include detecting, by the detector, a reflection of the second light signal from a second region of the calibration target having a second reflectivity. The detected reflection of the second light signal has a second intensity. The second intensity is different than the first intensity.

At sub-element 1122, block 1110 may include determining a second apparent range between the LIDAR device and the calibration target based on the detected reflection of the second light signal. The second apparent range is different than the first apparent range.

At sub-element 1124, block 1110 may include generating walk-error calibration data based on the first apparent range, the second apparent range, the first intensity, the second intensity, and an actual range between the LIDAR device and the calibration target.

Figure 11C:
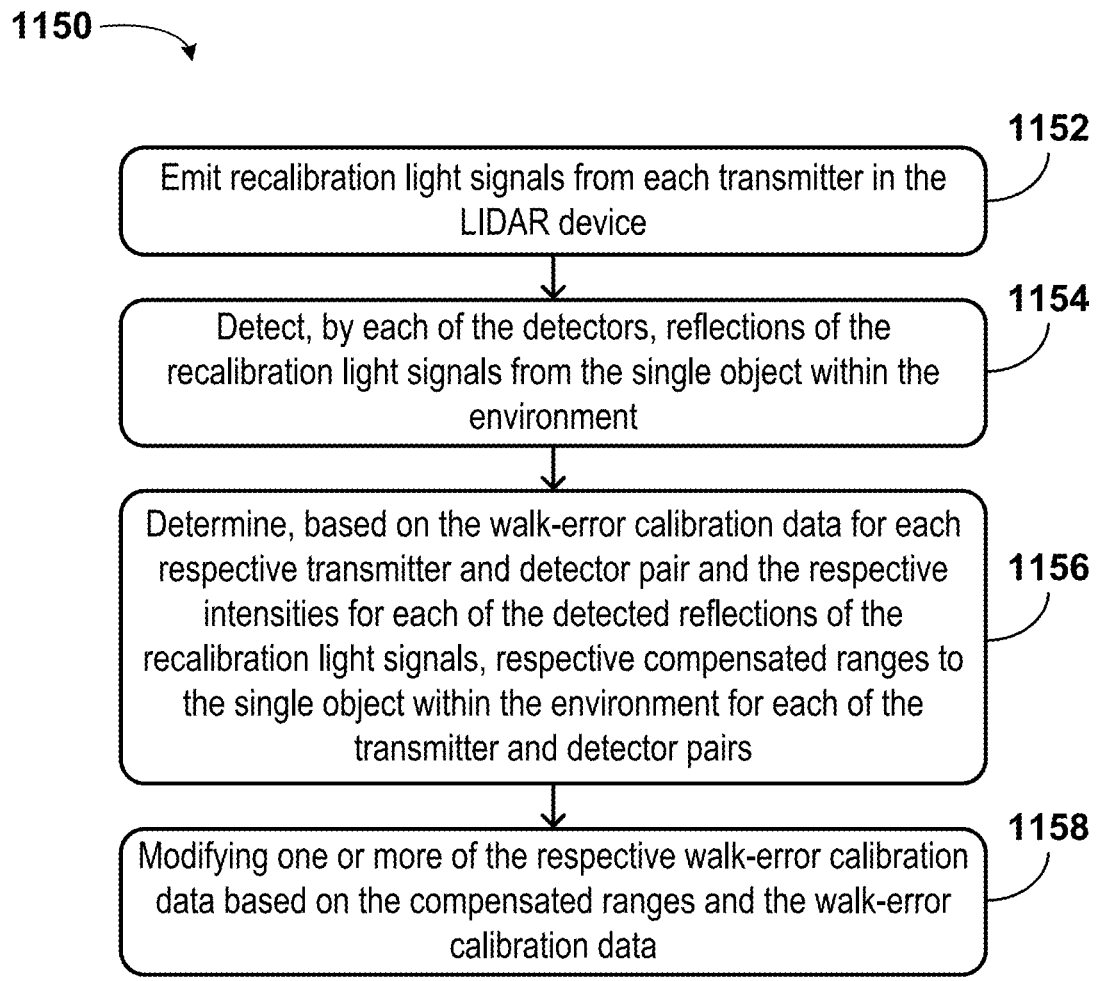
FIG. 11C is an illustration of sub-elements of a method, according to example embodiments.

FIG. 11C is a flowchart diagram of the sub-elements of block 1150 (e.g., blocks that are performed to adjust the respective walk-error calibration data for each of the plurality of transmitter and detector pairs).

At sub-element 1152, block 1150 may include emitting recalibration light signals from each transmitter in the LIDAR device. The recalibration light signals are each directed at a single object within an environment of the LIDAR device.

At sub-element 1154, block 1150 may include detecting, by each of the detectors, reflections of the recalibration light signals from the single object within the environment. Each of the reflections has a respective intensity.

At sub-element 1156, block 1150 may include determining, based on the walk-error calibration data for each respective transmitter and detector pair and the respective intensities for each of the detected reflections of the recalibration light signals, respective compensated ranges to the single object within the environment for each of the transmitter and detector pairs.

At sub-element 1158, block 1150 may include modifying one or more of the respective walk-error calibration data based on the compensated ranges and the walk-error calibration data.

Figure 12:
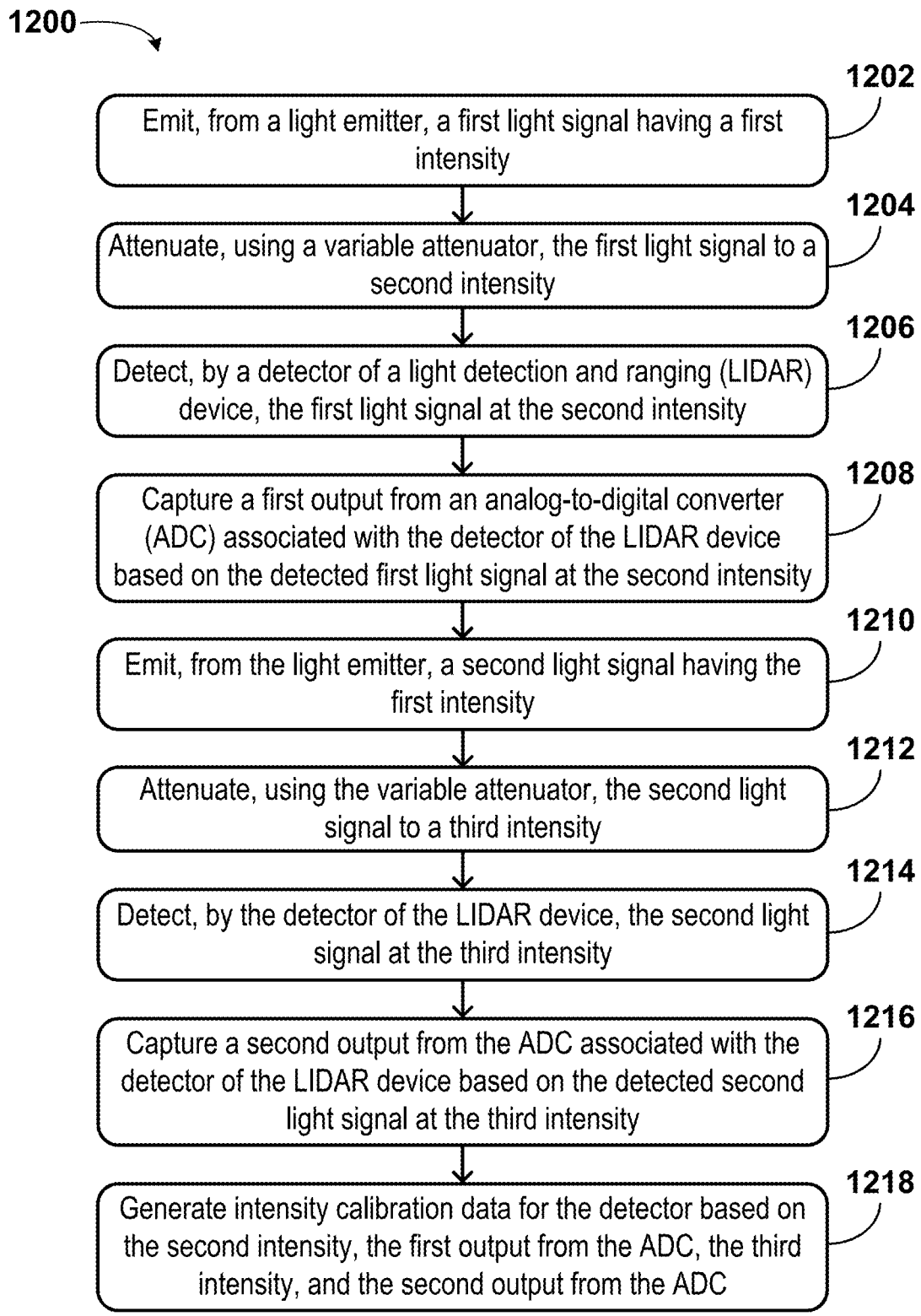
FIG. 12 is an illustration of a method, according to example embodiments.

FIG. 12 is a flowchart diagram of a method 1200, according to example embodiments. In some embodiments, one or more of the blocks of FIG. 12 may be performed by a computing device (e.g., the computer system 112 illustrated in FIG. 1). The computing device may include computing components such as a non-volatile memory (e.g., a hard drive or a ROM), a volatile memory (e.g., a RAM, such as DRAM or SRAM), a user-input device (e.g., a mouse or a keyboard), a display (e.g., an LED display or an LCD), and/or a network communication controller (e.g., a WIFI® controller, based on IEEE 802.11 standards, or an Ethernet controller). The computing device, for example, may execute instructions stored on a non-transitory, computer-readable medium (e.g., a hard drive) to perform one or more of the operations contemplated herein. Further, in some embodiments, one or more of the blocks of FIG. 12 may be performed by an intensity calibration system (e.g., the intensity calibration system 450 illustrated in FIG. 4B).

At block 1202, the method 1200 may include emitting, from a light emitter, a first light signal having a first intensity.

At block 1204, the method 1200 may include attenuating, using a variable attenuator, the first light signal to a second intensity.

At block 1206, the method 1200 may include detecting, by a detector of a light detection and ranging (LIDAR) device, the first light signal at the second intensity.

At block 1208, the method 1200 may include capturing a first output from an analog-to-digital converter (ADC) associated with the detector of the LIDAR device based on the detected first light signal at the second intensity.

At block 1210, the method 1200 may include emitting, from the light emitter, a second light signal having the first intensity.

At block 1212, the method 1200 may include attenuating, using the variable attenuator, the second light signal to a third intensity. The third intensity may be different from the second intensity.

At block 1214, the method 1200 may include detecting, by the detector of the LIDAR device, the second light signal at the third intensity.

At block 1216, the method 1200 may include capturing a second output from the ADC associated with the detector of the LIDAR device based on the detected second light signal at the third intensity.

At block 1218, the method 1200 may include generating intensity calibration data for the detector based on the second intensity, the first output from the ADC, the third intensity, and the second output from the ADC.

IV. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
    emitting, from a transmitter, a first light signal toward a calibration target;
    detecting, by a detector, a reflection of the first light signal from the calibration target, wherein the detected reflection of the first light signal has a first intensity;
    emitting, from the transmitter, a second light signal toward the calibration target;
    detecting, by the detector, a reflection of the second light signal from the calibration target,
    wherein the detected reflection of the second light signal has a second intensity, and
    wherein the second intensity is different than the first intensity;
    determining a first apparent range between the transmitter and the calibration target based on the detected reflection of the first light signal;
    determining a second apparent range between the transmitter and the calibration target based on the detected reflection of the second light signal, wherein the second apparent range is different than the first apparent range; and
    generating walk-error calibration data for the detector based on the first apparent range, the second apparent range, the first intensity, the second intensity, and an actual range between the transmitter and the calibration target.

2. The method of claim 1, wherein the calibration target comprises a retroreflective material or an optically transparent material.

3. The method of claim 1, further comprising:
    emitting, from the transmitter, a third light signal toward an edge of the calibration target;
    detecting, by the detector, a partial reflection of the third light signal from the edge of the calibration target,
    wherein the detected partial reflection of the third light signal has a third intensity, and
    wherein the third intensity is different than the first intensity and the second intensity; and
    determining a third apparent range between the transmitter and the calibration target based on the detected partial reflection of the third light signal,
    wherein the third apparent range is different than the first apparent range and the second apparent range, and
    wherein generating the walk-error calibration data for the detector is further based on the third apparent range and the third intensity.

4. The method of claim 1, wherein the first intensity and the second intensity are determined based on an output of an analog-to-digital converter (ADC).

5. The method of claim 1,
    wherein the detected reflection of the first light signal comprises a first waveform and determining the first apparent range comprises determining a time derivative of the first waveform, and
    wherein the detected reflection of the second light signal comprises a second waveform and determining the second apparent range comprises determining a time derivative of the second waveform.

6. The method of claim 5,
    wherein determining the first apparent range further comprises determining when the time derivative of the first waveform falls below a threshold value, and
    wherein determining the second apparent range further comprises determining when the time derivative of the second waveform falls below the threshold value.

7. The method of claim 1,
    wherein the walk-error calibration data comprises a look-up table, and
    wherein the method further comprises:
        determining an apparent distance to an object of interest;
        determining, based on the apparent distance to the object of interest and the look-up table, an actual distance to the object of interest; and
        adjusting a direction or velocity of a vehicle based on the actual distance to the object of interest.

8. The method of claim 1, further comprising tilting, rotating, or translating the transmitter prior to emitting the second light signal toward the calibration target.

9. The method of claim 1, further comprising:
    emitting, from an additional transmitter, a third light signal toward the calibration target;

detecting, by an additional detector, a reflection of the third light signal from the calibration target, wherein the detected reflection of the third light signal has a third intensity;

emitting, from the additional transmitter, a fourth light signal toward the calibration target;

detecting, by the additional detector, a reflection of the fourth light signal from the calibration target, wherein the detected reflection of the fourth light signal has a fourth intensity, and wherein the fourth intensity is different than the third intensity;

determining a third apparent range between the additional transmitter and the calibration target based on the detected reflection of the third light signal;

determining a fourth apparent range between the additional transmitter and the calibration target based on the detected reflection of the fourth light signal, wherein the fourth apparent range is different than the third apparent range; and generating walk-error calibration data for the additional detector based on the third apparent range, the fourth apparent range, the third intensity, the fourth intensity, and the actual range between the additional transmitter and the calibration target.

10. The method of claim 9, further comprising emitting, from the transmitter, a fifth light signal toward an object in an environment;

detecting, by the detector, a reflection of the fifth light signal from the object in the environment, wherein the detected reflection of the fifth light signal has a fifth intensity;

emitting, from the additional transmitter, a sixth light signal toward the object in the environment;

detecting, by the additional detector, a reflection of the sixth light signal from the object in the environment, wherein the detected reflection of the sixth light signal has a sixth intensity;

determining a first compensated range between the transmitter and the object based on the walk-error calibration data for the detector and the fifth intensity;

determining a second compensated range between the additional transmitter and the object based on the walk-error calibration data for the additional detector and the sixth intensity;

comparing the first compensated range and the second compensated range; and modifying the walk-error calibration data for the detector or the walk-error calibration data for the additional detector based on the comparison between the first compensated range and the second compensated range.

11. The method of claim 10, wherein the transmitter or the additional transmitter is mounted on a vehicle.

12. The method of claim 10, wherein comparing the first compensated range and the second compensated range comprises accounting for a difference in a position of the detector and a position of the additional detector relative to the object in the environment.

13. The method of claim 12, wherein accounting for the difference in the position of the detector and the position of the additional detector relative to the object in the environment comprises:

accounting for differences in distances relative to the object in the environment; or accounting for differences in reflectivity of the object in the environment based on angle relative to the object.

14. A calibration system comprising:
a calibration target;
a transmitter;
a detector,
wherein the transmitter is configured to emit a first light signal toward the calibration target,
wherein the detector is configured to detect a detected reflection of the first light signal from the calibration target,
wherein the detected reflection of the first light signal has a first intensity,
wherein the transmitter is configured to emit a second light signal toward the calibration target,
wherein the detector is configured to detect a detected reflection of the second light signal from the calibration target,
wherein the detected reflection of the second light signal has a second intensity, and
wherein the second intensity is different than the first intensity; and
a computing device associated with the transmitter and the detector, wherein the computing device is configured to:
determine a first apparent range between the transmitter and the calibration target based on the detected reflection of the first light signal;
determine a second apparent range between the transmitter and the calibration target based on the detected reflection of the second light signal, wherein the second apparent range is different than the first apparent range; and
generate walk-error calibration data for the detector based on the first apparent range, the second apparent range, the first intensity, the second intensity, and an actual range between the transmitter and the calibration target.

15. The calibration system of claim 14, wherein the calibration target comprises a retroreflective material or an optically transparent material.

16. The calibration system of claim 14, further comprising a stage configured to tilt, rotate, or translate the transmitter.

17. The calibration system of claim 14, further comprising a stage configured to tilt, rotate, or translate the detector.

18. The calibration system of claim 14, further comprising a stage configured to tilt, rotate, or translate the calibration target.

19. A method comprising:
emitting, from a light emitter, a first light signal having a first intensity;
attenuating, using a variable attenuator, the first light signal to a second intensity;
detecting, by a detector, the first light signal at the second intensity;
capturing a first output from an analog-to-digital converter (ADC) based on the detected first light signal at the second intensity;
emitting, from the light emitter, a second light signal having the first intensity;
attenuating, using the variable attenuator, the second light signal to a third intensity, wherein the third intensity is different from the second intensity;
detecting, by the detector, the second light signal at the third intensity;
capturing a second output from the ADC based on the detected second light signal at the third intensity; and generating intensity calibration data for the detector based on the second intensity, the first output from the ADC, the third intensity, and the second output from the ADC.

20. The method of claim 19, wherein the intensity calibration data comprises a look-up table.

\* \* \* \* \*